(12) United States Patent
Chiang et al.

(10) Patent No.: US 12,743,141 B2
(45) Date of Patent: Sep. 22, 2026

(54) MODULAR POWER DISTRIBUTION SYSTEM FOR INFORMATION PROCESSING DEVICES

(71) Applicant: HEWLETT PACKARD ENTERPRISE DEVELOPMENT LP, Spring, TX (US)

(72) Inventors: Chih-Wei Chiang, Taoyuan City (TW); Chui Ching Chiu, Taoyuan City (TW); Hsueh-Yu Chao, Taipei (TW)

(73) Assignee: Hewlett Packard Enterprise Development LP, Spring, TX (US)

( * ) Notice: Subject to any disclaimer, the term of this patent is extended or adjusted under 35 U.S.C. 154(b) by 236 days.

(21) Appl. No.: 18/426,876

(22) Filed: Jan. 30, 2024

(65) Prior Publication Data

US 2025/0244809 A1 Jul. 31, 2025

(51) Int. Cl.
*G06F 1/26* (2006.01)
*H01R 12/72* (2011.01)

(52) U.S. Cl.
CPC .............. *G06F 1/26* (2013.01); *H01R 12/722* (2013.01)

(58) Field of Classification Search
CPC .......... H01R 12/722; G06F 1/26; G06F 1/189
See application file for complete search history.

(56) References Cited

U.S. PATENT DOCUMENTS 11,163,343 B1 11/2021 Lin et al.
2003/0230934 A1* 12/2003 Cordelli ............... H01R 25/003 307/43
2005/0237724 A1* 10/2005 Fiorentino .............. G06F 1/189 361/752
2011/0080693 A1* 4/2011 Tsai ........................ G06F 1/189 361/627
2013/0193764 A1* 8/2013 Bailey ..................... H02J 9/062 713/300
2015/0143140 A1* 5/2015 Bailey ...................... H02B 1/21 713/300
2017/0093102 A1 3/2017 Huang

* cited by examiner

*Primary Examiner* — Timothy J Thompson
*Assistant Examiner* — Rhadames Alonzo Miller
(74) *Attorney, Agent, or Firm* — Jones Burke, PLLC

(57) ABSTRACT

A modular power distribution subsystem for an information processing device, comprises one or more power distribution boards and a plurality of bus bars. Each power distribution board may comprise a first edge-connector socket configured to receive a first power supply unit (PSU) edge connector and a second edge-connector socket configured to receive a second PSU edge connector, with the second edge-connector socket having a different form factor than the first edge-connector socket. The power distribution board may further comprise a plurality of power-pin sockets, each configured to receive a power pin of one of the bus bars. The power distribution boards are connectable, by the bus bars and the power-pin sockets, to a system board of the information processing device in a plurality of different configurations that accommodate a plurality of different types of PSUs and/or a plurality of different positional arrangements of PSUs.

12 Claims, 13 Drawing Sheets

FIG. 1

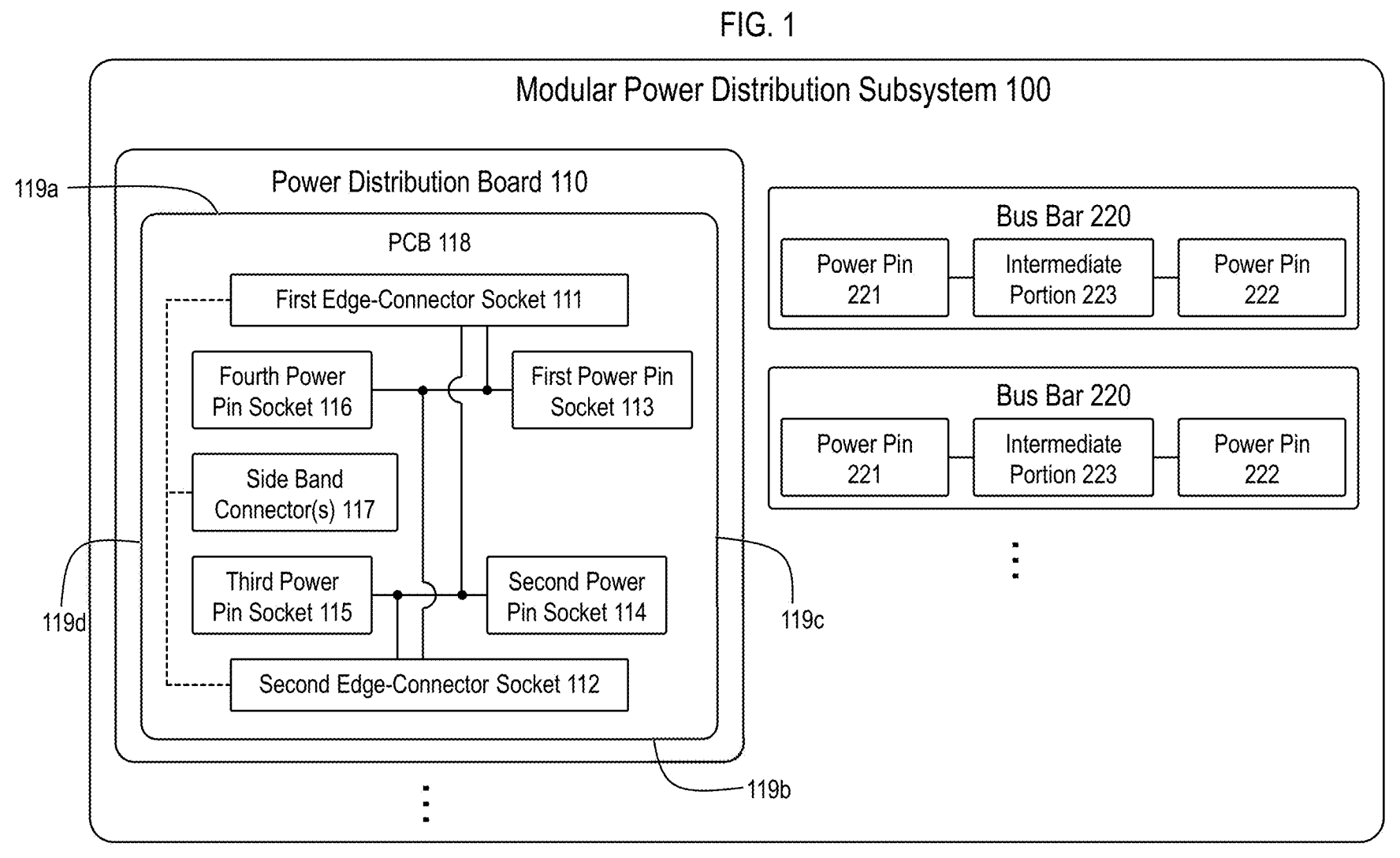

Modular Power Distribution Subsystem 100

Power Distribution Board 110

PCB 118

First Edge-Connector Socket 111

First Power Pin Socket 113

Second Power Pin Socket 114

Second Edge-Connector Socket 112

Fourth Power Pin Socket 116

Side Band Connector(s) 117

Third Power Pin Socket 115

119a

119b

119c

119d

Bus Bar 220

Power Pin 221

Intermediate Portion 223

Power Pin 222

Bus Bar 220

Power Pin 221

Intermediate Portion 223

Power Pin 222

...

...

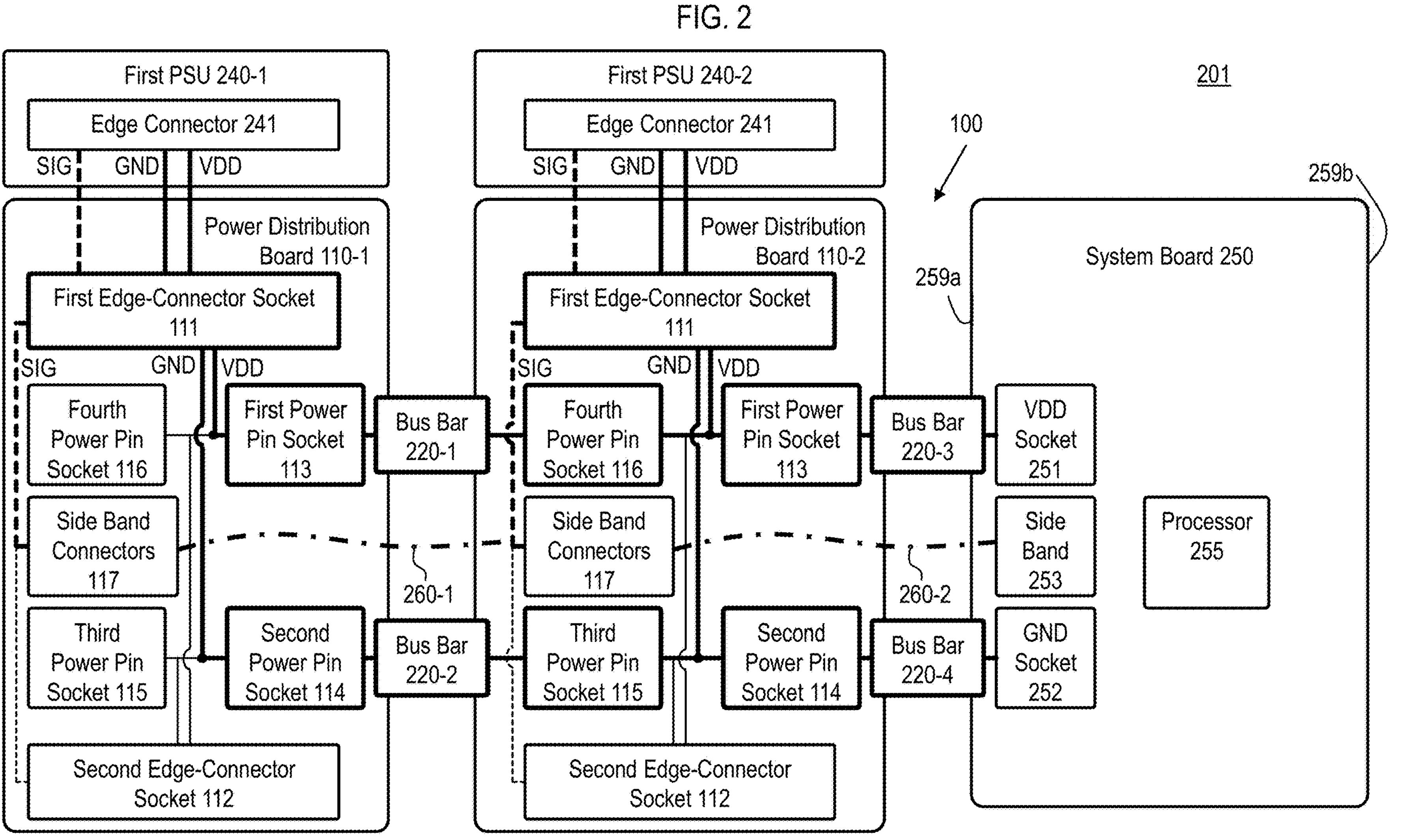
FIG. 2
201
100
First PSU 240-1
Edge Connector 241
SIG
GND
VDD
Power Distribution Board 110-1
First Edge-Connector Socket 111
SIG
GND
VDD
Fourth Power Pin Socket 116
First Power Pin Socket 113
Side Band Connectors 117
Third Power Pin Socket 115
Second Power Pin Socket 114
Second Edge-Connector Socket 112
Bus Bar 220-1
260-1
Bus Bar 220-2
First PSU 240-2
Edge Connector 241
SIG
GND
VDD
Power Distribution Board 110-2
First Edge-Connector Socket 111
SIG
GND
VDD
Fourth Power Pin Socket 116
First Power Pin Socket 113
Side Band Connectors 117
Third Power Pin Socket 115
Second Power Pin Socket 114
Second Edge-Connector Socket 112
Bus Bar 220-3
260-2
Bus Bar 220-4
259a
259b
System Board 250
VDD Socket 251
Side Band 253
GND Socket 252
Processor 255

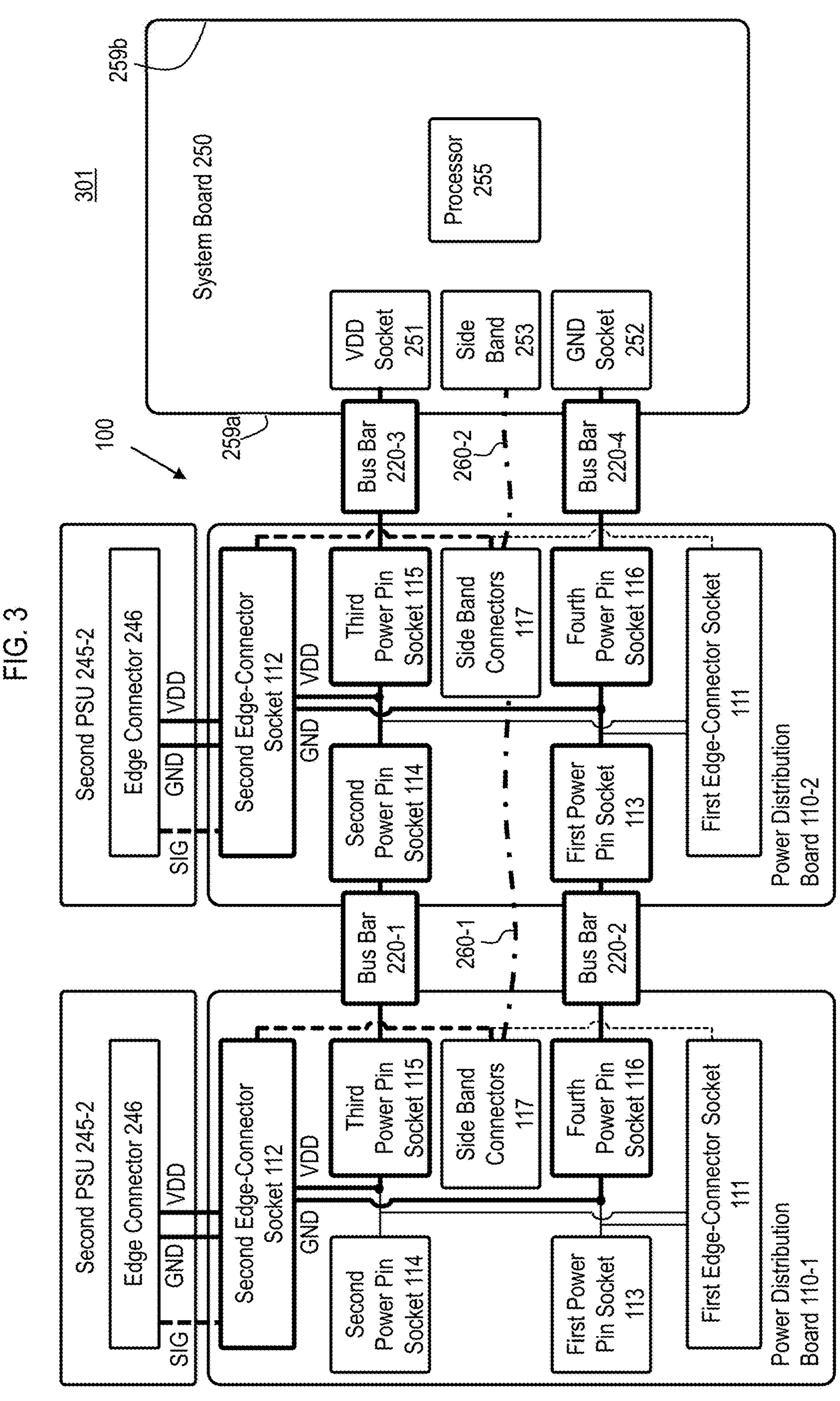
FIG. 3
301
100
System Board 250
259b
259a
Processor 255
VDD Socket 251
Side Band 253
GND Socket 252
Bus Bar 220-3
260-2
Bus Bar 220-4
Second PSU 245-2
Edge Connector 246
VDD
GND
SIG
Second Edge-Connector Socket 112
VDD
GND
Third Power Pin Socket 115
Side Band Connectors 117
Fourth Power Pin Socket 116
First Edge-Connector Socket 111
Second Power Pin Socket 114
First Power Pin Socket 113
Power Distribution Board 110-2
Bus Bar 220-1
260-1
Bus Bar 220-2
Second PSU 245-2
Edge Connector 246
VDD
GND
SIG
Second Edge-Connector Socket 112
VDD
GND
Third Power Pin Socket 115
Side Band Connectors 117
Fourth Power Pin Socket 116
First Edge-Connector Socket 111
Second Power Pin Socket 114
First Power Pin Socket 113
Power Distribution Board 110-1

Figure 5:
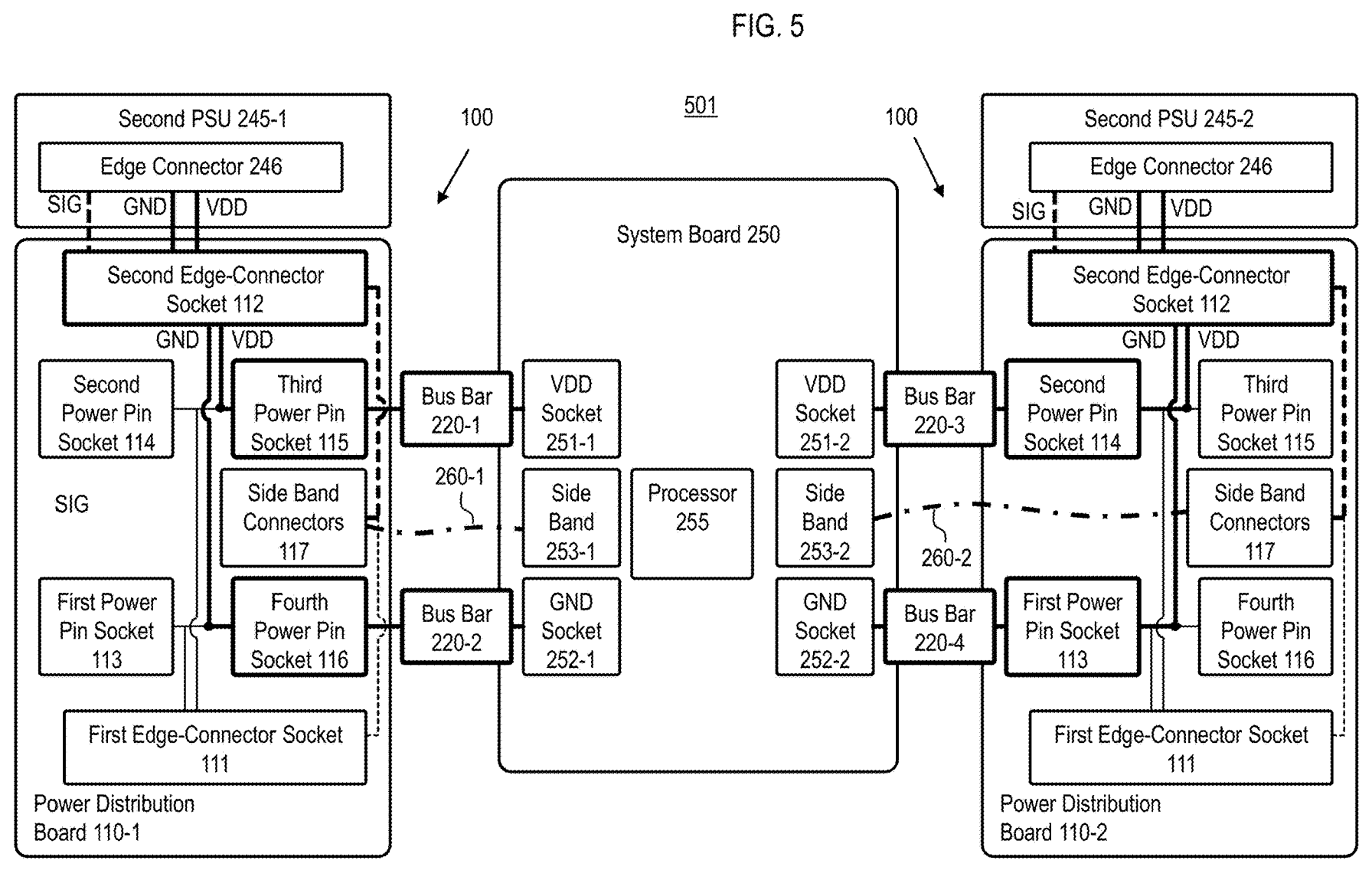

Second PSU 245-2
Edge Connector 246
VDD
GND
SIG
Second Edge-Connector Socket 112
VDD
GND
Third Power Pin Socket 115
Side Band Connectors 117
Fourth Power Pin Socket 116
First Edge-Connector Socket 111
Second Power Pin Socket 114
First Power Pin Socket 113
Power Distribution Board 110-2
Bus Bar 220-3
260-2
Bus Bar 220-4

System Board 250
VDD Socket 251-2
Side Band 253-2
GND Socket 252-2
Processor 255
VDD Socket 251-1
Side Band 253-1
GND Socket 252-1

Bus Bar 220-1
260-1
Bus Bar 220-2

Second PSU 245-1
Edge Connector 246
VDD
GND
SIG
Second Edge-Connector Socket 112
VDD
GND
Third Power Pin Socket 115
Side Band Connectors 117
Fourth Power Pin Socket 116
First Edge-Connector Socket 111
Second Power Pin Socket 114
SIG
First Power Pin Socket 113
Power Distribution Board 110-1

FIG. 6
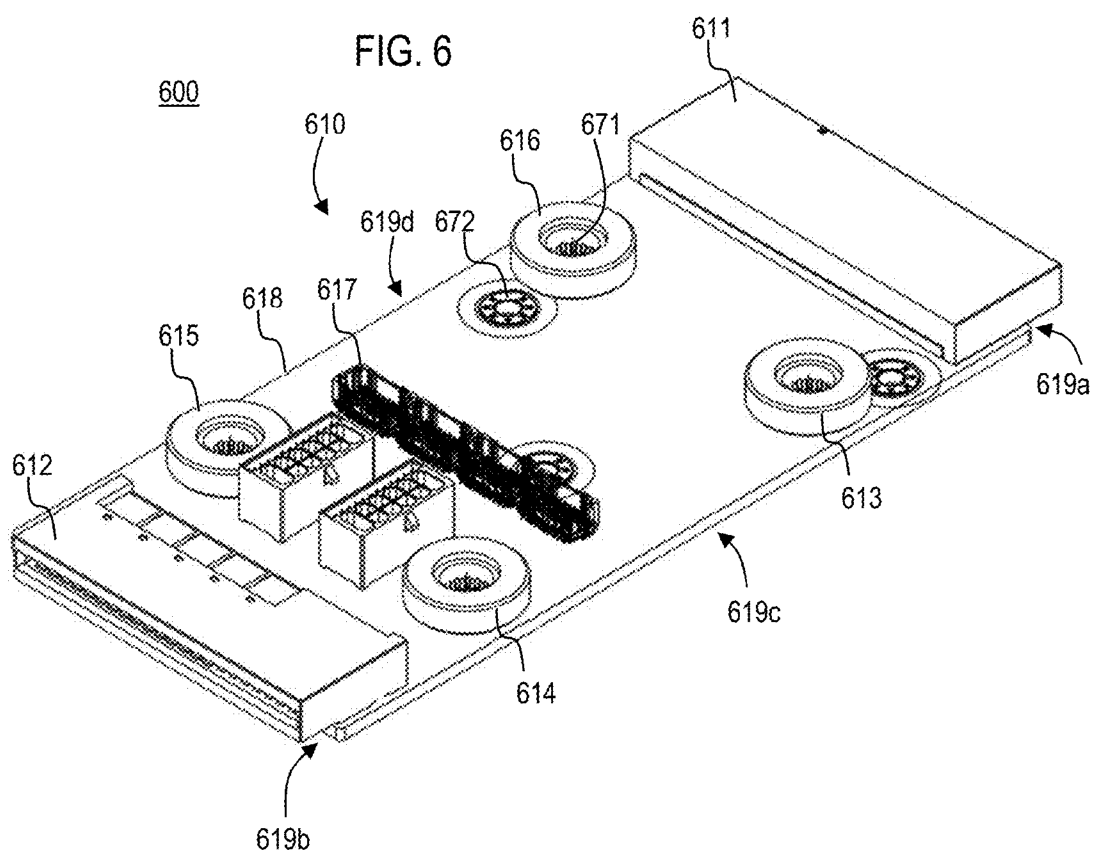
FIG. 8
FIG. 7
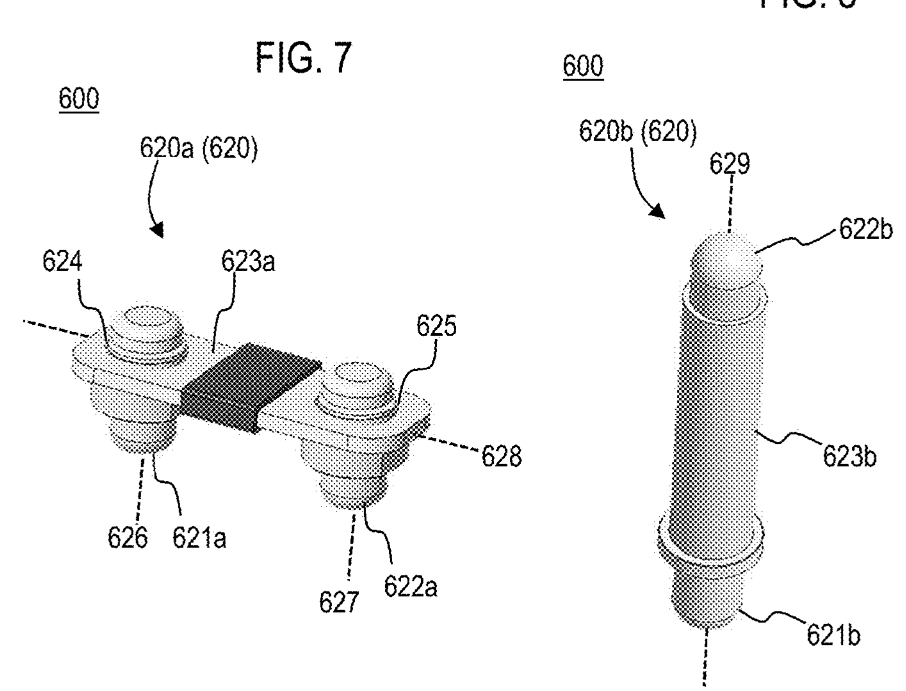

MODULAR POWER DISTRIBUTION SYSTEM FOR INFORMATION PROCESSING DEVICES

INTRODUCTION

Information processing systems, such as computers and networking devices, generally include a system board (e.g., a motherboard). The system board may include a processor and other components. The information processing devices also generally include one or more power supply units (PSUs) to supply electrical power to the system board and other components. The PSUs may receive an input power and convert that input power into a different form, such as by converting input alternative current (AC) into direct current (DC) and/or converting input power at one voltage level into output power at another voltage level. In many cases, multiple PSUs are provided for each information processing device, for example to provide greater power capacity for high power components and/or to provide redundancy in case of the failure of one PSU.

In many information processing systems, particularly in enterprise grade information processing systems, the PSU is provided in the form of a removable module which can be removably inserted into a cage of a chassis of the information processing system and, when so inserted, electrically connect to the system board via blind mate connectors. Specifically, in many of these systems, the PSU comprises an edge connector (also referred to as a PCB gold finger connector) which is configured to removably blind-mate with a complementary edge-connector socket mounted to the system board. The edge-connector socket is electrically connected to the processor and/or other components of the system board via power delivery circuitry formed in or on the system board, such as conductive traces in the system board, voltage regulators mounted to the system board, etc., and thus when the PSU edge connector is mated with the complementary edge-connector socket, electrical power can flow between the PSU and the other components of the system.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operation. In the drawings:

FIG. 1 is a block diagram illustrating an example power distribution subsystem.

FIG. 2 is a block diagram illustrating an example information processing system comprising the power distribution subsystem of FIG. 1 in a first configuration.

FIG. 3 is a block diagram illustrating another example information processing system comprising the power distribution subsystem of FIG. 1 in a second configuration.

FIG. 4 is a block diagram illustrating another example information processing system comprising the power distribution subsystem of FIG. 1 in a third configuration.

FIG. 5 is a block diagram illustrating another example information processing system comprising the power distribution subsystem of FIG. 1 in a fourth configuration.

FIG. 6 is a perspective view of an example power distribution board of an example power distribution system.

FIG. 7 is a perspective view of an example bus bar of the example power distribution system of FIG. 6.

FIG. 8 is a perspective view of another example bus bar of the example power distribution system of FIG. 6.

DETAILED DESCRIPTION

Figure 9:
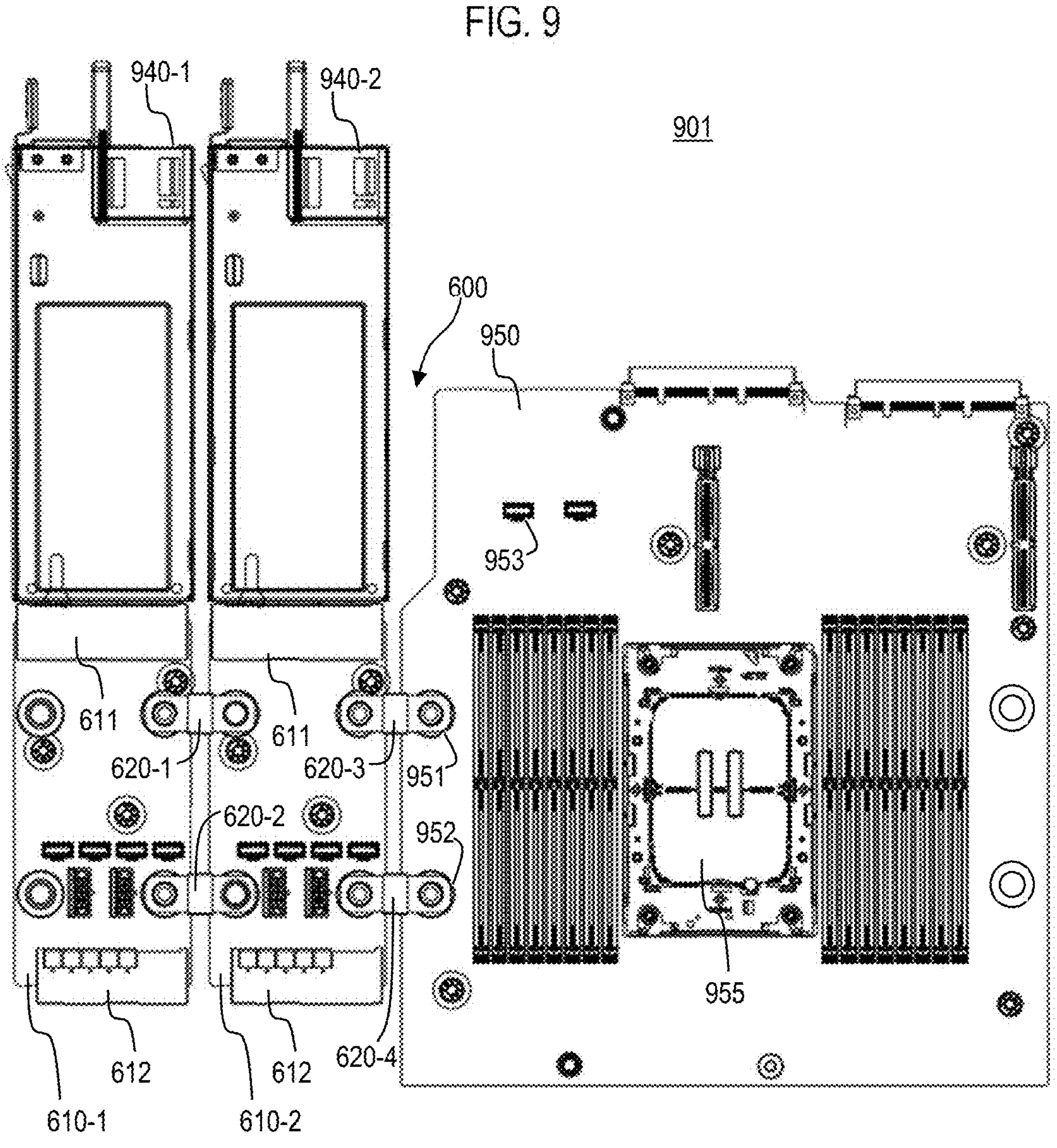
FIG. 9 is a top view of an example information processing system comprising the power distribution system of FIG. 6 in a first configuration.

Information processing systems can come in a variety of different form factors and may also vary in the types of components they include and/or the locations at which those components are disposed in the system. Variation in form factor and in components occurs not only between different models of information processing devices but can also occur within a single model or family of information processing systems, which may be offered with a variety of different optional configurations.

Among the things that may vary from one information processing system to another are the PSUs. Specifically, information processing systems may vary in the type of PSU that they utilize and/or in the positions at which the PSUs are disposed within the system. For example, some systems may utilize a first type of PSU having a first type of edge connector (e.g., a 73.5 mm edge connector) while other systems may utilize a second type of PSU having a second type of edge connector (e.g., a 60.0 mm edge connector). Moreover, some systems may locate PSUs adjacent one another on one side of the system board, while other systems may locate PSUs adjacent one another on the other side of the system board, and still other systems may distribute the PSUs on two opposite sides of the system board. Additionally, in some systems the PSUs are horizontally aligned with one another, while in other systems the PSUs are aligned vertically with one another.

The above-described variation in PSU configuration can make the manufacture of information processing systems more complicated and costly because the variation in PSU configuration may require multiple different system boards to be designed and manufactured. Specifically, in some cases one unique system board may need to be designed and manufactured for each unique PSU configuration the manufacturer intends to utilize. For example, different system boards having different types of edge-connector sockets may need to be designed and produced to accommodate the different types of edge connectors of different PSUs (e.g., one system board having sockets to receive the 73.5 mm edge connector of the first type of PSU, another system board having sockets to receive the 60.0 mm edge connector of the second type of PSU, etc.). As another example, different system boards having differently positioned edge-connector sockets may need to be designed and produced for each of the desired PSU positional configurations (e.g., system boards with both sockets on one side thereof, system boards with both sockets on another side thereof, system boards with one socket on each side thereof, etc.). When different types and different locations of PSU are considered together, a multiplicity of different system board designs may be needed—for example, if there are two types of PSU and four possible PSU positional configurations, then eight different system board designs may be needed to accommodate these PSU configurations.

Generally, the need to design and manufacture multiple system boards for different system configurations increases manufacturing costs and complexity. Additional engineering time may be needed to design the different system boards, resulting in increased development costs. Furthermore, the manufacturing of the multiple different boards may require the use of multiple manufacturing/assembly lines, which increases manufacturing complexity and costs. Moreover, each system board may need to have a different stock-keeping-unit (SKU), which increases logistical complexity and costs.

To address these and other issues, systems disclosed herein may utilize modular power distribution subsystems that can be interposed between the PSU and the system board and that can be arranged in a variety of configurations, which accommodate multiple different PSU configurations (e.g., multiple different types of PSUs and/or multiple different positional arrangements of PSUs). In this manner, the modular power distribution subsystems may allow the same system board to be utilized with multiple different information processing system configurations. This ability to use a single system board design for multiple different configurations of an information processing system can reduce manufacturing complexity and costs.

The modular power distribution subsystems disclosed herein each comprise one or more power distribution boards and multiple bus bars. The power distribution boards are configured to be electrically connected to the PSUs, and the bus bars are configured to electrically connect the power distribution boards to one another and/or to the system board. Thus, in examples disclosed herein, the PSUs are indirectly connected to the system board via the power distribution board(s) and bus bars, instead of the PSUs being connected directly to the system board as in other approaches.

The power distribution boards and bus bars can be connected to the system board in multiple possible positional arrangements, with each positional arrangement of the power distribution boards accommodating a corresponding positional arrangement of PSUs. For example, in some implementations the power distribution boards can be selectively positioned in a first arrangement or a second arrangement: in the first arrangement, the power distribution boards are positioned adjacent one another on the same side of the system board and are connected to one another and the system board in a daisy chain fashion (e.g., a first power distribution board is connected to a second power distribution board which is in turn connected to the system board); in the second arrangement, power distribution boards are positioned on two opposite sides of the system board (e.g., a first power distribution board is positioned adjacent a first side of the system board and a second power distribution board is positioned adjacent a second side of the system board, with both first and second power distribution boards being connected directly to the system board). Other positional arrangements may also be possible in some examples, as described in greater detail below in relation to the figures. Thus, the power distribution subsystem can be selectively configured to accommodate multiple positional arrangements of PSUs by selectively positioning the power distribution boards.

In addition, in some examples, the power distribution boards can accommodate multiple different types of PSUs having different types of edge connector. For example, in some implementations each power distribution board includes a printed circuit board (PCB) and two different types of edge-connector sockets mounted to opposite ends of the PCB. Specifically, a first edge-connector socket is mounted to a first end portion of the PCB and is configured to receive a first type of edge connector of a first type of PSU, whereas the second edge-connector socket is mounted to a second end portion of the PCB (opposite the first end portion) and is configured to receive a second type of edge connector of a second type of PSU. Thus, the power distribution boards can be configured to accommodate the first type of PSU by selectively orienting the power distribution boards with their first ends facing the cages which hold the PSUs, such that their first edge-connector sockets are positioned to blind mate with the edge connectors of the first type of PSUs when the PSUs inserted into the cages. Conversely, the power distribution boards can be configured to accommodate the second type of PSU by selectively orienting the power distribution boards with their second ends facing the cages which hold the PSUs, such that their second edge-connector sockets are positioned to blind mate with the edge connectors of the second type of PSUs when the PSUs inserted into the cages. In this manner the power distribution subsystem can be selectively configured to accommodate multiple types of PSUs by selectively orienting the power distribution boards with either the first or second edge-connector sockets facing the PSU cages.

Turning now to the figures, various devices, systems, and methods in accordance with aspects of the present disclosure will be described.

FIG. 1 is a block diagram conceptually illustrating a modular power distribution subsystem 100 ("subsystem 100") for use in an information processing system, such as a computing device (e.g., server), networking device (e.g., switch), or other information processing system. It should be understood that FIG. 1 is not intended to illustrate specific shapes, dimensions, or other structural details accurately or to scale, and that implementations of the subsystem 100 may have different numbers and arrangements of the illustrated components and may also include other parts that are not illustrated.

As shown in FIG. 1, the modular power distribution subsystem 100 comprises one or more power distribution boards 110 and multiple bus bars 220. For simplicity, FIG. 1 illustrates just one of the power distribution boards 110 and two of the bus bars 220, but any number of power distribution boards 110 and bus bars 220 may be provided as part of the subsystem 100. In some examples, at least two bus bars 220 are provided per power distribution board 110. In some examples, the number of power distribution boards 110 that are provided as part of the modular power distribution subsystem 100 may depend on the number of PSUs that are intended to be included in the information processing system with which the subsystem 100 is intended to be used, with one power distribution board 110 being provided per PSU in some examples. In some implementations, subsystem 100 comprises two power distribution boards 110 and four bus bars 220. In other implementations, subsystem 100 comprises three or more power distribution boards 110 and six or more bus bars 220.

As shown in FIG. 1, each of the power distribution board 110 comprises: a PCB 118, a first edge-connector socket 111; a second edge-connector socket 112; first, second, third, and fourth power-pin sockets 113, 114, 115, and 116; and one or more side-band connectors 117. These components will be described in turn below.

Figure 4:
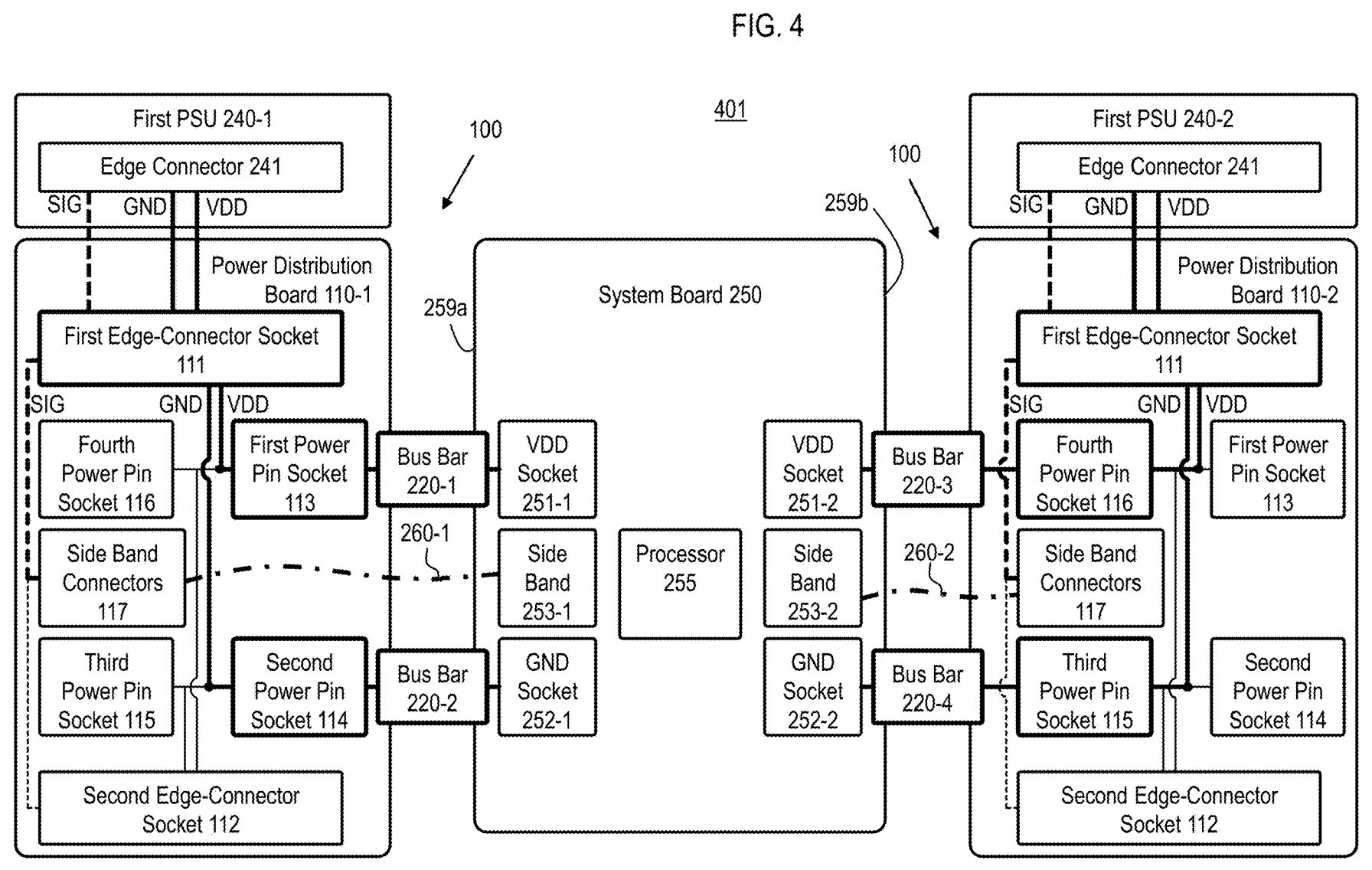

The first edge-connector socket 111 is mounted to a first end portion 119*a* of the PCB 118 and is configured to receive a first type of edge connector of a first type of PSU (such as edge connector 241 of first PSU 240 in FIGS. 2 and 4). For example, in some implementations the first edge-connector socket 111 is configured to receive a 73.5 mm PSU edge connector. The first edge-connector socket 111 may comprise a receptacle configured (e.g., sized, shaped, etc.) to receive the first PSU edge connector. The first edge-connector socket 111 further comprises electrical contacts (e.g., spring fingers) disposed in the receptacle with a layout complementary to that of the electrical contacts (e.g., contact pads) of the first edge connector such that the electrical contacts of the first edge-connector socket 111 contact the electrical contacts of the first edge connector when the edge connector is received in the receptacle. The electrical contacts of the first edge-connector socket 111 are electrically connected to circuitry (e.g., conductive traces) in or on the PCB 118, for example via solder or other connection techniques familiar to those in the art. In some examples, the first edge-connector socket 111 is mounted to the PCB 118 such that the edge connector is parallel to the PCB 118 when received in the first edge-connector socket 111. In some examples, the first edge-connector socket 111 is surface mounted to a face of the PCB 118. In other examples, the first edge-connector socket 111 is straddle mounted to an edge of the PCB 118. Techniques for mounting connector sockets to a PCB are familiar to those of ordinary skill in the art, and thus are not described herein.

The second edge-connector socket 112 is mounted to a second end portion 119*b* of the PCB 118, which is opposite from the first end portion 119*a*, and is configured to receive a second type of edge connector of a second type of PSU (such as edge connector 246 of second PSU 245 in FIGS. 3 and 5). For example, in some implementations the second edge-connector socket 112 is configured to receive a 60.0 mm PSU edge connector.

The second edge-connector socket 112 may be mounted to the PCB 118 and electrically connected to circuitry thereof in a similar manner as the first edge-connector socket 111, except that the second edge-connector socket 112 is oriented in an opposite direction than the first edge-connector socket 111. Thus, if the board 110 is oriented in a first orientation relative to a system board, the first socket 111 may face in a first direction relative to the system whereas the second socket 112 faces in a second direction, opposite the first direction, but if the board 110 is rotated 180 degrees to a second orientation, the second socket 112 may now face in the first direction whereas the first socket 111 now faces in the second direction. Accordingly, by reorienting the board 110, the first socket 111 or the second socket 112 can be selectively exposed for connection to a PSU edge connector—for example, in a system in which the PSUs are positioned to the rear of the system board, in a first orientation the first socket 111 may face rearward and thus may be positioned to receive an edge connector of a PSU installed in the system, whereas in a second orientation the second socket 112 may face rearward and thus may be positioned to receive an edge connector of a PSU installed in the system.

Like the first edge-connector socket 111, the second edge-connector socket 112 comprises a receptacle and electrical contacts disposed in the receptacle and electrically connected to circuitry in the PCB 118, but the sockets 111 and 112 differ from one another in that they are configured to receive different types of edge connectors. Specifically, the sockets 111 and 112 may have a different form factor, which, as used herein, means that: (a) the openings of their receptacles have different sizes and/or shapes (e.g., different lengths, widths, depths, and/or keying features), and/or (b) they have different arrangements of electrical contacts in their receptacles (e.g., different numbers or locations of electrical contacts).

During operation (e.g., in a state in which a PSU is connected to the boards 110 and is operational), some of the electrical contacts of the first and second edge-connector sockets 111 and 112 may carry electrical power signals communicated with the PSU, whereas other electrical contacts of the first and second edge-connector sockets 111 and 112 may carry side-band data signals communicated with the PSU. The electrical contacts of the first and second edge-connector sockets 111 and 112 which carry the electrical power signals may be referred to herein as power contacts, whereas the electrical contacts of the first and second edge-connector sockets 111 and 112 which carry the data signals may be referred to herein as side-band contacts. More specifically, those of the power contacts that carry the supply voltage VDD during operation may be referred to herein as VDD contacts, and those of the power contacts that carry the ground voltage GND during operation may be referred to herein as GND contacts. Each of the edge-connector sockets 111 and 112 comprises one or more VDD contacts and one or more GND contacts. Which electrical contacts of the sockets 111 and 112 are VDD contacts and which are GND contacts may be determined based on which electrical contacts of the PSU edge connector they contact when a PSU edge connector is mated with the respective socket 111 and 112.

The first, second, third, and fourth power-pin sockets 113, 114, 115, and 116 comprise sockets configured to receive power pins 221 or 222 of the bus bars 220. For example, the power-pin sockets 113, 114, 115, and 116 may each comprise a ring-shaped portion defining a central opening into which the power pins are inserted and which comprising electrical contacts arranged in the central opening to contact the pin when received therein. For example, the power pins 221 and 222 and power-pin sockets 113, 114, 115, and 116 may comprise Sentrality pins/sockets made by Molex, or other similar types of pins/sockets made by any other manufacturer. The first, second, third, and fourth power-pin sockets 113, 114, 115, and 116 are electrically connected to the power contacts of the first and second edge-connector sockets 111 and 112.

More specifically, first and fourth sockets 113 and 116 are electrically connected to one another, electrically connected to a same power contact(s) of the first edge-connector socket 111 as one another, and electrically connected to a same power contact(s) of the second edge-connector socket 112 as one another. Similarly, second and third sockets 114 and 115 are electrically connected to one another, electrically connected to a same power contact(s) of the first edge-connector socket 111 as one another, and electrically connected to a same power contact(s) of the second edge-connector socket 112 as one another. Thus, the first and fourth power-pin sockets 113 and 116 will carry the same voltage as one another, and the second and third power-pin sockets 114 and 115 will carry the same voltage as one another. Moreover, the first and fourth power-pin sockets 113 and 116 will always carry a different voltage than the second and third power-pin sockets 114 and 115 during normal operation—e.g., the first and fourth power-pin sockets 113 and 116 will carry the supply voltage VDD when the second and third power-pin sockets 114 and 115 carry the ground voltage GND, or vice versa.

For example, in some implementations, the first and fourth sockets 113 and 116 are connected to the VDD contacts of the first socket 111 and to the GND contacts of the second socket 112. Conversely, in these implementations, the second and third sockets 114 and 115 are connected to the GND contacts of the first socket 111 and to the VDD contacts of the second socket 112. Accordingly, in such examples, if the PSU is connected to the first socket 111 then the first and fourth sockets 113 and 116 will carry the supply voltage VDD and the second and third sockets 114 and 115 will carry the ground voltage GND, but if the PSU is connected to the second socket 112 then the first and fourth sockets 113 and 116 will carry the ground voltage GND and the second and third sockets 114 and 115 will carry the supply voltage VDD.

In some other implementations, the first and fourth sockets 113 and 116 are connected to the VDD contacts in both the first and second edge-connector sockets 111 and 112, and the second and third sockets 114 and 115 are connected to the GND contacts in both the first and second edge-connector sockets 111 and 112. Therefore, in these examples, the first and fourth sockets 113 and 116 always carry the supply voltage VDD and the second and third sockets 114 and 115 always carry the ground voltage GND regardless of which of the sockets 111 or 112 the PSU is connected to.

In some examples, the first and second sockets 113 and 114 may be arranged near a same side 119*c* of the PCB 118 as one another and may form a first pair of power-pin sockets, whereas the third and fourth sockets 115 and 116 may be arranged near an opposite side 119*d* of the PCB 118 and may form a second pair of power-pin sockets. Each pair of power-pin sockets may be connected to an adjacent item (e.g., another board 110 or a system board) by a corresponding pair of the bus bars 220—for example, the first pair of sockets 113 and 114 may be connected an item (e.g., another board 110 or a system board) that is positioned adjacent the side 119*c* whereas the second pair of sockets 115 and 116 may be connected an item (e.g., another board 110 or a system board) that is positioned adjacent the side 119*d*. In some examples, the positional relationship of the sides 119*c* and 119*d* relative to a system board may be changed depending on the location and orientation of the board 110 relative to system board.

The side-band connector(s) 117 comprise one or more electrical connectors mounted to the PCB 118 and electrically connected to the side-band contacts of the first and second edge-connector sockets 111 and 112. These side-band connector(s) 117 are configured to removably receive connectors of electrical cables. The side-band connectors 117 and the cables (not illustrated) connected thereto may allow the side-band data signals to be communicated between the PSU and the system board. In some cases, cables can connect all of the power distribution boards directly to the system board (e.g., the connector 117 of each power distribution board 110 is connected to one end of a corresponding cable and the other end of each cable is plugged into a connector of the system board). In other cases, cables can connect the power distribution boards 110 to the system board in a daisy-chain fashion (e.g., a first cable extends between a connector 117 of a first power distribution board 110 and a connector 117 of a second power distribution board 110, and a second cable extends between another connector 117 of the second power distribution board 110 and a connector of the system board. The connector(s) 117 may be any type of electrical connector for receiving a cable connector.

Each bus bar 220 may comprise a power pin 221, a power pin 222, and an intermediate portion 223 electrically connecting the power pins 221 and 222. In some examples, the power pins 221 and 222 and the intermediate portion 223 are physically distinct parts which are coupled together. In other examples, the power pins 221 and 222 and the intermediate portion 223 are all integrally connected, i.e., part of the same unitary (monolithic) body. Each power pin 221 and 222 comprises a conductive material (e.g., copper, aluminum, or other metal) forming a protrusion which is configured to be received into the opening of one of the power-pin sockets 113, 114, 115, or 116 and thereby establish an electrical connection therewith. In some examples, the protrusion of the power pin 221 or 222 may be cylindrical in shape. In some examples, the power pin 221 and 222 is secured in the power-pin sockets 113, 114, 115, or 116 by a friction fit. In other examples, the pins 221 and 222 may include a fastener (e.g., threads, a nut, etc.) to secure it in the power-pin sockets 113, 114, 115, or 116. In some examples, the intermediate portion 223 comprises a bar or strip of electrically conductive material (e.g., copper, aluminum, etc.) with apertures provided at opposite end portions thereof, and the pins 221 and 222 are coupled to the bar by insertion into the apparatus. In some examples, the pins 221 and 222 and the intermediate portion 223 are formed from a single columnar body of electrically conductive material, with the pin 221 corresponding to one end portion of the columnar body, the pin 222 corresponding to an opposite end portion of the columnar body, and the intermediate portion corresponding to a portion of the columnar body extending between the two end portions.

The bus bars 220 may be used to electrically connect a power distribution board 110 to the system board. For example, the pin 221 of a bus bar 220 may be connected to a first power-pin socket 113 of the power distribution board 110 and the pin 222 of the same bus bar 220 may be connected to a power-pin socket of a system board (which may be similar in configuration to the power-pin sockets 113, 114, 115, or 116). The bus bars 220 may also be used to electrically connect a power distribution board 110 to another power distribution board 110. For example, the pin 221 of a bus bar 220 may be connected to the first power-pin socket 113 of a first power distribution board 110 and the pin 222 of the same bus bar 220 may be connected to the fourth power-pin socket 116 of a second power distribution board 110. These are merely two examples, and any number of other connection arrangements can be achieved by connecting the bus bars 220 to the various power-pin sockets 113 to 116 of various power distribution boards and/or to power-pin sockets of the system board.

Turning now to FIGS. 2-5, various information processing systems 201, 301, 401, and 501 will be described. The information processing systems 201, 301, 401, and 501 each comprise an instance of the modular power distribution subsystem 100 described above, but with the modular power distribution subsystem 100 being configured differently in each case. These example systems are intended to illustrate how, in principle, the modular power distribution subsystem 100 can be selectively reconfigured to accommodate different PSU arrangements, but these examples are not intended to exhaustively show every possible configuration of the subsystem 100 or every possible information processing system comprising the subsystem 100. It should be understood that the principles illustrated in these figures and described below can be applied to configure the subsystem 100 into a variety of other configurations, such as configurations having three or more power distribution boards for example.

FIG. 2 illustrates an information processing system 201. The system 201 comprises a system board 250, an instance of the modular power distribution subsystem 100 in a first configuration, and two first PSUs 240 (i.e., PSU 240-1 and PSU 240-2).

In the system 201, the first PSUs 240-1 are a first type of PSU, which have a first type of edge connector 241. For example, in some instances the first PSUs 240-1 and 240-2 comprise 73.5 mm PSU edge connectors. References herein to different "types" of PSU edge connector refer to different form factors of edge connector, so that edge connectors having the same form factor (i.e., they have the same receptacle opening size and shape and the same electrical contact arrangement) are the same "type" of edge connector whereas edge connectors having different form factors (i.e., they have receptacle openings that differ in size or shape or different electrical contact arrangements) are different "types" of edge connectors. References herein to "type" in connection with a PSU should be understood as referring to PSUs that have different types of edge connectors (e.g., two PSUs having a first type of edge connector may be considered the same "type" of PSU even if they differ in other ways, and two PSUs having different types of edge connectors may be considered as different "types" of PSU even if they are similar in other ways).

The system board 250 comprises a PCB (not labeled), a processor 255 mounted to the PCB, one or more VDD sockets 251, one or more GND sockets 252, and a side-band connector 253. The VDD sockets 251 and GND sockets 252 are each configured to receive a pin 221 or 222 of one of the bus bars 220—for example, they may be configured similarly to the power-pin sockets 113 to 116. In some examples, the VDD sockets 251 and GND sockets 252 may be positioned near one edge of the system board 250, which is adjacent to a space where the power distribution subsystem 100 is disposed.

The power distribution subsystem 100 in the first configuration comprises at least two of the power distribution boards 110 (e.g., the boards 110-1 and 110-2 in FIG. 2), which are positioned adjacent to one another near a first side 259*a* of the system board 250 and which are connected together and to the system board 250 in a daisy-chain arrangement. In addition, in the first configuration, the boards 110 are oriented such that their first edge-connector sockets 111 are positioned to mate with the edge connectors 241 of the PSUs 240—i.e., in examples in which the PSUs 240 are positioned rearward of the system board 250 (e.g., at the rear of a chassis of the system 201), the boards 110 are oriented with their first edge-connector sockets 111 facing rearward.

As noted above, in the first configuration, the boards 110 are connected in a daisy chain arrangement. This means that the boards 110 are electrically connected together forming a chain, with the last board 110 in the chain being connected to the system board 250, such that all of the boards 110 other than the last board 110 are connected indirectly to the system board 250 via one or more other boards 110. In FIG. 2, two boards 110-1 and 110-2 are illustrated as an example, but it should be understood that more than two boards 110 could be arranged in a similar daisy chain arrangement in the first configuration.

With reference to the two-board 110 example illustrated in FIG. 2, in the first configuration, a first power distribution board 110-1 is connected to the second power distribution board 110-2 via a first pair of bus bars 220-1 and 220-2, whereas the second power distribution board 110-2 is connected to the system board via a second pair of bus bars 220-3 and 220-4. In particular, as shown in FIG. 2, the first pair of bus bars 220-1 and 220-2 connect the first pair of power-pin sockets 113 and 114 of the first board 110-1 to the second pair of power-pin sockets 115 and 116 of the second board 110-2, and the second pair of bus bars 220-3 and 220-4 connect the first pair of power-pin sockets 113 and 114 of the second board 110-2 to the system board 250. More specifically, as shown in FIG. 2: the bus bar 220-1 is connected to the first power-pin socket 113 of first board 111-1 and to the fourth power-pin socket 116 of second board 110-2; the bus bar 220-2 is connected to the second power-pin socket 114 of first board 110-1 and to the third power-pin socket 115 of second board 110-2; the bus bar 220-3 is connected to the first power-pin socket 113 of first board 111-1 and to the VDD socket 251 of system board 250; and the bus bar 220-4 is connected to the second power-pin socket 114 of first board 111-1 and to the GND socket 252 of system board 250. (When only two boards 110 are present, the second pair of sockets 115 and 116 of the board 110-1 are unused in the first configuration; however, in examples in which additional boards 110 are present, then in the first configuration the second pair of sockets 115 and 116 of the board 110-1 may be used to connect to another board 110 positioned adjacent the board 110-1 on an opposite side from the board 110-2).

Moreover, in this example, the first power-pin socket 113 of each power distribution board 110 is connected to the VDD contact of the first edge-connector socket 111, which receives the supply voltage VDD from the corresponding PSU 240. Accordingly, a conductive pathway is formed to convey the supply voltage VDD from each of the PSUs 240 to the VDD socket 251 of the system board 250. The conductive pathway for the supply voltage VDD from the edge-connector sockets 111 comprises the first power-pin socket 113 of board 1101-1, bus bar 220-1, fourth power-pin socket 116 of board 110-2, first power-pin socket 113 of board 110-2, and bus bar 220-3. Similarly, the conductive pathway for the ground voltage GND from the edge-connector sockets 111 comprises second power-pin socket 114 of board 110-1, bus bar 202-2, third power-pin socket 115 of board 110-2, second power-pin socket 114 of bord 110-2, and bus bar 220-4.

Side band signals are conveyed between system board 250 and PSUs 240 via cables 260, which connect to side-band connectors 117 of the power distribution boards 110 and to side-band connector(s) 253 of the system board. In some implementations of system 201, cables 260 connect the side-band connectors 117 in a daisy chained fashion, as illustrated in FIG. 2. That is, first cable 260-1 connects a side-band connector 117 of board 110-1 to a first side-band connector 117 of board 110-2, and a second cable 260-2 connects a second side-band connector 117 of board 110-2 to side-band connector 253. In this manner, side-band signals from PSU 240-1 are first passed to board 110-1, then to board 110-2, and then to system board. In other implementations (not illustrated), a side-band connector 117 of each board 110-1 is connected by a cable directly to a corresponding side-band connector 253 of the system board 250.

Turning now to FIG. 3, another information processing system 301 will be described. The information processing system 301 may comprise the same system board 250 as the system 201 and may also comprise the same spatial arrangement of boards 110 relative to the system board 250 as was found in the system 201. That is, like the first configuration, in the second configuration, the boards 110 are positioned adjacent one another along the same side of the system board 250 (e.g., side 259*a* in FIG. 2) and are connected together and to the system board 250 in a daisy-chain arrangement.

However, the system 301 differs from the system 201 in that the system 301 comprises a second type of PSU 245 instead of the first type of PSU 240 and the modular power distribution subsystem 100 is therefore reconfigured to a second configuration in order to accommodate the second type of PSU 245. Specifically, the second type of PSU 245 comprises a second type of edge connector 246 (e.g., a 60.0 mm PSU edge connector), which is configured to connect with the second edge-connector sockets 112. Accordingly, in the second configuration, the power distribution boards 110 have been reoriented (rotated 180 degrees) relative to their poses in the first configuration such that their second edge-connector sockets 112 are now positioned to mate with the PSUs 245 (e.g., facing rearward in systems with PSUs located at the rear). As with the first configuration, more than two boards 110 can be present, but an example of two boards 110-1 and 110-2 is shown in FIG. 3 as an illustrative example.

As a result of the reorientation of the boards 110-1 and 110-2, the bus bars 220-1 to 220-4 are now coupled to different ones of the power-pin sockets 113-116 of the boards 110-1 and 110-2 than they were in the first configuration. In particular, as shown in FIG. 3, the first pair of bus bars 220-1 and 220-2 is now connected to the second pair of power-pin sockets 115 and 116 of the first board 110-1 and to the first pair of power-pin sockets 113 and 114 of the second board 110-2, and the second pair of bus bars 220-3 and 220-4 is now connected to the second pair of power-pin sockets 115 and 116 of the second board 110-2. More specifically, bus bar 220-1 is connected to third socket 115 of board 110-1 and second socket 114 of board 110-2; bus bar 220-2 is connected to fourth socket 116 of board 110-1 and first socket 113 of board 110-2; bus bar 220-3 is connected to third socket 115 of board 110-2 and VDD socket of system board 250; and bus bar 220-4 is connected to fourth socket 116 of board 110-2 and GND socket 252 of system board 250. In this manner a conductive path is formed from PSUs 245-1 and 254-2 to the VDD socket 251 for conveying the supply voltage VDD, with the path comprising third socket 115 of board 110-1, bus bar 220-1, second socket 114 of board 110-2, third socket 115 of board 110-2, and bus bar 220-3. Similarly, a conductive path is formed from PSUs 245-1 and 254-2 to the GND socket 252 for conveying the ground voltage GND, with the path comprising fourth socket 116 of board 110-1, bus bar 220-2, first socket 113 of board 110-2, fourth socket 116 of board 110-2, and bus bar 220-4.

The side-band connections may be similar in the second configuration as in the first configuration.

Although the boards 110 are shown positioned along the side 259*a* in FIGS. 2 and 3, in various implementations the boards 110 could instead be positioned along the opposite side 259*b*. In other words, there may be at least two variations of the first configuration: one with boards 110 on the side 259*a* and one with the boards 110 on the side 259*b*. Similarly, there may be at least two variations of the second configuration: one with boards 110 on the side 259*a* and one with the boards 110 on the side 259*b*.

Turning now to FIG. 4, another information processing system 401 will be described. The information processing system 401 may comprise the same (or similar) system board 250 as the systems 201 and 301 and may also comprise the same power distribution boards 110-1 and 110-2 as the systems 201 and 301. Furthermore, in the system 401, the first PSUs 240 are used, and therefore the boards 110-1 and 110-2 are oriented with their first edge-connector sockets 111 to mate with the PSUs 240, similar to in the first configuration of the system 201.

However, the system 401 differs from the systems 201 and 301 in that, in the system 401, the power distribution subsystem 100 is in a third configuration in which at least some of the power distribution boards 110 are positioned on opposite sides of the system board 250 from one another. That is, a first group of the power distribution boards 110 is positioned adjacent the side 259*a* while a second group of the power distribution boards 110 is positioned adjacent the opposite side 259*b*. Moreover, in the third configuration, instead of all of the boards 110 being connected together and to the system board in a daisy-chain arrangement, the two groups of boards 110 on opposite sides 259*a* and 259*b* may be separately connected to the system board 250.

In FIG. 4, an illustrative example is shown in which there are two boards 110-1 and 110-2, and thus in the illustrated example the aforementioned "groups" of boards 110 which are disposed on the sides 259*a* and 259*b* each have just one board 110. However, in other examples, more than one board 110 can be provided in each group, in which case the boards 110 which are in the same group could be connected together and to the system board 250 in a daisy-chain, in a manner similar to that described above in relation to FIGS. 2 and 3.

Returning to the example illustrated in FIG. 4, the power distribution board 110-1 is positioned adjacent the first side 259*a* of the system board 250, while the power distribution board 110-2 is positioned adjacent the second side 259*b* of the system board 250. Moreover, in this configuration, instead of the boards 110-1 and 110-2 being connected to one another and connected to system board 250 in a daisy-chain fashion, the boards 110-1 and 110-2 are each connected to the system board 250 without an intervening board 110. In particular, a first pair of bus bars 220-1 and 220-2 connects the first pair of sockets 113 and 114 of the first board 110-1 to the system board 250, whereas a second pair of bus bars 220-3 and 220-4 connects the second pair of sockets 114 and 116 of the second board 110-2 to the system board 250. More specifically, bus bar 220-1 connects first power-pin socket 113 of board 110-1 to first VDD socket 251-1 of system board 250; bus bar 220-2 connect second power-pin socket 114 of board 110-1 to first GND socket 252-1 of system board 250; bus bar 220-3 connects fourth power-pin socket 116 of board 110-2 to second VDD socket 251-2; and bus bar 220-4 connected third power-pin socket 115 of board 110-2 to second GND socket 252-2. In this manner two conductive paths are formed for the power supply voltage VDD-one from PSU 240-1 to first VDD socket 251-1 (via first socket 113 of board 110-1 and bus bar 220-1), and another from PSU 240-2 to second VDD socket 251-2 (via fourth socket 116 of board 110-2 and bus bar 220-3). Similarly, two conductive paths are formed for the ground voltage GND-one from PSU 240-1 to first GND socket 252-1 (via second socket 114 of board 110-1 and bus bard 220-2), and another from PSU 240-2 to second GND socket 252-2 (via third socket 115 of board 110-2 and bus bard 220-4).

In addition, in this configuration side-band connections may be made by cables 260-1 and 260-2 connecting each of the power distribution boards 110-1 and 110-2, respectively, to different side-band connectors 253-1 and 253-2 of the system board 250.

Turning now to FIG. 5, another information processing system 501 will be described. The information processing system 501 may comprise the same system board 250 as the system 401 and may also comprise the same spatial arrangement of power distribution boards 110 relative to the system board 250 as was found in the system 401. That is, the boards 110 are arranged in two groups (each comprising at least one board 110), with one group adjacent the side 259*a* and the other group adjacent the opposite side 259*b*.

However, the system 501 differs from the system 401 in that the system 501 comprises the second type of PSU 245 instead of the first type of PSU 240 and the modular power distribution subsystem 100 is therefore reconfigured to a fourth configuration in order to accommodate the second type of PSU 245. Specifically, in the fourth configuration, the power distribution boards 110-1 and 110-2 have been reoriented (rotated 180 degrees) relative to their poses in the third configuration such that their second edge-connector sockets 112 are now positioned to mate with the PSUs 245 (e.g., facing rearward in systems with PSUs located at the rear).

Consequently, the bus bars may now be connected to different power pins sockets of the board 110-1 and 110-2 than they were in the third configuration. Bus bar 220-1 connects third power-pin socket 115 of board 110-1 to first VDD socket 251-1 of system board 250; bus bar 220-2 connect fourth power-pin socket 116 of board 110-1 to first GND socket 252-1 of system board 250; bus bar 220-3 connects second power-pin socket 114 of board 110-2 to second VDD socket 251-2; and bus bar 220-4 connects first power-pin socket 113 of board 110-2 to second GND socket 252-2. In this manner two conductive paths are formed for the power supply voltage VDD-one from PSU 245-1 to first VDD socket 251-1 (via third socket 115 of board 110-1 and bus bar 220-1), and another from PSU 245-2 to second VDD socket 251-2 (via second socket 114 of board 110-2 and bus bar 220-3). Similarly, two conductive paths are formed for the ground voltage GND-one from PSU 245-1 to first GND socket 252-1 (via fourth socket 116 of board 110-1 and bus bar 220-2), and another from PSU 245-2 to second GND socket 252-2 (via first socket 113 of board 110-2 and bus bar 220-4).

As can be seen by comparing FIGS. 2-5, the modular power distribution subsystem 100 can be reconfigured between multiple different configurations which can accommodate multiple different types of PSUs and/or multiple different spatial arrangements of PSUs. As used herein, for a given configuration of the subsystem 100 to be able to "accommodate" certain types or spatial arrangements of PSUs means that, if the subsystem 100 were installed in the given configuration in an information processing system, the boards 110 would be able to receive and connect to the PSUs in an operable manner that allows power signals to be communicated from the PSUs to the system board via the subsystem 100.

For example, the first configuration (FIG. 2) and the third configuration (FIG. 4) can accommodate the first type of PSU 240, whereases the second configuration (FIG. 3) and the fourth configuration (FIG. 5) can accommodate the second type of PSU 245. Moreover, the first and second configurations (FIGS. 2-3) can accommodate at least one positional arrangement of PSUs (e.g., an arrangement in which all of the PSUs are positioned adjacent one another near one side of the system board 250), whereas the third and fourth configurations (FIGS. 4-5) can accommodate at least one other positional arrangement of PSUs (e.g., an arrangement in which some PSUs are positioned adjacent one another near one side 259*a* of the system board 250, while other PSUs are positioned adjacent one another near an opposite side 259*b* of the system board 250).

Moreover, additional positional arrangements of PSUs besides those shown in FIGS. 2-5 can also be accommodated by the subsystem 100. These additional spatial arrangements may be accommodated by variations on the first through fourth configurations described above. For example, as noted above, although FIGS. 2 and 3 show the boards 110 positioned on the side 259*a* of the system board 250 as one illustrative example, in a variation of the first configuration or in a variation on the second configuration, the boards 110 could alternatively be positioned along the opposite side 259*b* of the system board 250, with the bus bars 220 connecting the power distribution subsystem 100 to a VDD socket 251-2 and a GND socket 252-2 disposed along the side 259*b* of the system board 250. In addition, although FIGS. 2-5 show illustrative examples with two boards 110, in variations on the first through fourth configurations, more than two PSUs and corresponding power distribution boards 110 may be provided. For example, in variations on the first and second configurations, three or more power distribution boards 110 may be arranged on the same side of the system board 250. As another example, in variations on the third and fourth configurations, three or more power distribution boards 110 may be distributed in two groups positioned on different sides of the system board (e.g., two on one side, two on an opposite side). Furthermore, in each of the first through fourth configurations, boards 110 which are described as being adjacent to one another could be horizontally adjacent to one another in some variations or vertically adjacent one another in other variations. Thus, a multiplicity of spatial arrangements of PSUs can be accommodated by reconfiguring the power distribution subsystem between the above-described configurations and variations thereof.

Because the modular power distribution subsystem 100 can be selectively configured in a variety of different configurations which can accommodate multiple different types of PSUs and/or multiple different spatial arrangements of PSUs, the same system board may be usable to form multiple differently configured information processing systems. For example, in some cases the same system board 250 can be used to form all of the above-described system configurations. Being able to reuse the same system board design across multiple systems can reduce the costs associated with manufacturing those systems.

Turning now to FIGS. 6-8, an example modular power distribution subsystem 600 will be described, which is one example implementation of the modular power distribution subsystem 100. The subsystem 600 comprises components which correspond to (e.g., are example implementations of) components for the subsystem 100, and these corresponding components are given similar reference numbers having the same last two digits, such as 111 and 611. Various descriptions of aspects of the components of the subsystem 100 above apply to the corresponding components of the subsystem 600, and thus duplicative descriptions of such aspects will be omitted. Although subsystem 600 is one example of the subsystem 100, the subsystem 100 is not limited to the subsystem 600.

The subsystem 600 comprises one or more power distribution boards 610 (see FIG. 6) and multiple bus bars 620 (see FIGS. 7 and 8). As shown in FIG. 6, each power distribution board 610 comprises a PCB 618, first and second edge-connector sockets 611 and 612 mounted to opposite end portions 619*a* and 619*b* of the PCB 618, first, second, third, and fourth power-pin sockets 613, 614, 615, and 616 mounted to PCB 618, and side-band connectors 617 mounted to PCB. The first edge-connector socket 611 is configured to receive a first type of PSU 640, while the second edge-connector socket 612 is configured to receive a second type of PUS 645. Specifically, the sockets 611 and 612 may have a different form factor, as defined above.

The power-pin sockets 613, 614, 615, and 616 comprise ring-shaped sockets with openings configured to receive columnar pins and contacts 671 disposed in the openings to engage the pins and establish an electrical connection therewith. In some examples, the opening may extend all the way through the thickness of the PCB 618, which may enable pins 621 or 622 of the bus bars 620 to connect to the sockets 613, 614, 615, or 616 from either above or below the PCB 618. A first pair of the sockets 613 and 614 are provided near a first side 619*c* of the PCB 618, while a second pair of the sockets 615 and 616 are provided near a second side 619*d* of the PCB 618. The power-pin sockets 613, 614, 615, and 616 are electrically connected to the power contacts of the sockets 611 and 612 in the manner described above in relation to the subsystem 100. The side-band connectors 617 comprise cable receptacles configured to receive connectors of cables and are connected to the signal contacts of the sockets 611 and 612 as described above. The PCB 618 may also comprise attachment features 672, such as screw holes or other attachment features, which all for the board 610 to be physically secured to a chassis of an information processing system when installed therein.

As shown in FIG. 7, the bus bars 620 may include a first type of bus bar 620*a*. The bus bar 620*a* has a plate-type configuration in which the intermediate portion 623*a* is formed from a bar, plate, or sheet of conductive material and the power pins 221*a* and 221*b* are coupled to and protrude perpendicularly from the intermediate portion 623*a*. Specifically, the power pins 221*a* and 221*b* may be generally cylindrical, but need not be perfectly cylindrical (e.g., they may have different diameters at different portions and/or surface features such as ledge or flanges or tapered lead in surfaces). Moreover, the power pin 221*a* is coupled to one end portion of the intermediate portion 623*a* via a first hole 624, whereas the power pin 222*a* coupled to an opposite end portion of the intermediate portion 623*a* via a second hole 625. In this plate-type bus bar 620*a*, the cylindrical power pins 221*a* and 221*b* protrude along axes 626 and 627 which are perpendicular to the intermediate portion 623*a* (e.g., perpendicular to a longitudinal dimension of the intermediate portion 623*a*, which extends parallel to axis 628 in FIG. 7). This structure allows the bus bar 620*a* to be positioned so as to connect two items (such as two boards 610) which are horizontally adjacent to one another. For example, the bus bar 220*a* may be positioned vertically above or below the two items (e.g., two boards 610) with the intermediate portion 623*a* extending horizontally between the two items, and the power pins 221*a* and 221*b* may extending vertically downward or upward into sockets of the two items. For example, see the bus bars 220*a* in FIGS. 9-13, which are described in greater detail below.

Figure 15:
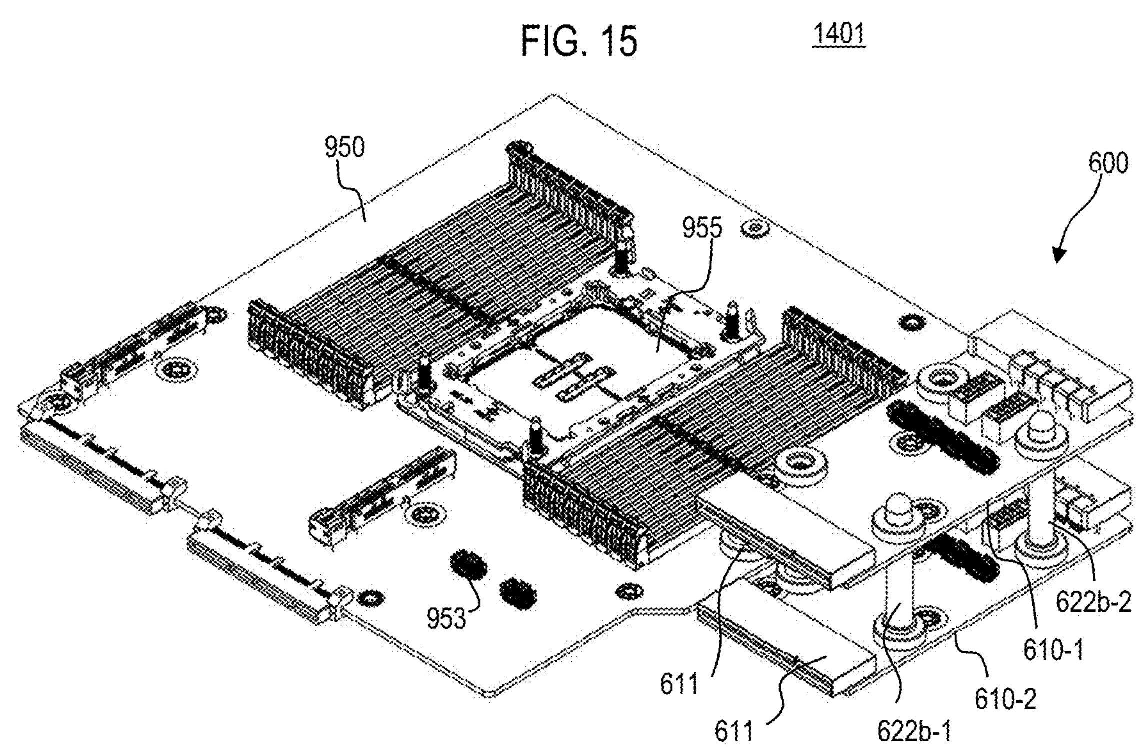
FIG. 15 is a front right perspective view of another example information processing system comprising the power distribution system of FIG. 6 in a fifth configuration.
Figure 16:
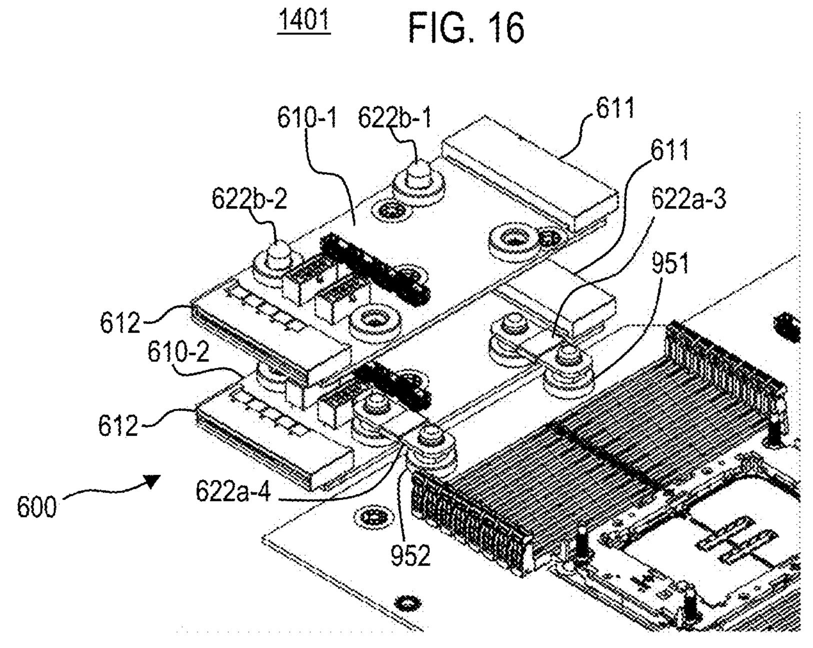
FIG. 16 is a partial rear left perspective view of a portion of the information processing system of FIG. 15.

As shown in FIG. 8, the bus bars 620 may also include a second type of bus bar 620*b*. The bus bar 620*b* has a columnar configuration in which the pins 621*b* and 622*b* and the intermediate portion 623*b* are all formed as part of one columnar body extending along a common axis 629. The columnar body may be generally cylindrical in shape, but need not be perfectly cylindrical (e.g., it may have different diameters at different portions and/or surface features such as ledge or flanges or tapered lead in surfaces). The pin 621*b* is formed at one end of the columnar body, the pin 622*b* is formed at the opposite end of the columnar body, and the intermediate portion 623*b* extends between the two pins 621*b* and 622*b*. This columnar structure allows the bus bar 620*b* to be positioned so as to connect two items (such as two boards 610) which are vertically stacked atop on one another—for example, the bus bar 220*b* may be positioned vertically above one of the two items and vertically below the other of the two items, with the power pin 221*b* extending downward into a socket on the lower item and the power pin 222*b* extending upward into socket on the upper item. FIGS. 15 and 16, which are described in greater detail below, illustrate one such example.

Turning now to FIGS. 9-16, various example information processing systems 901, 1001, 1101, 1201, 1301, 1401, and 1501 will be described. These example information processing systems each comprise an instance of the modular power distribution subsystem 600 described above, but with the modular power distribution subsystem 600 being arranged in a different configuration in each of the systems.

FIG. 9 illustrates a system 901 with the modular power distribution subsystem 600 in a first configuration. The first configuration illustrated in FIG. 9 corresponds to one implementation example of the first configuration described above in relation to FIG. 2. In this example, the system 901 comprises a system board 950 with a processor 955, which is one example of the system board 250, the subsystem 600, which is one example of the subsystem 100, and the first PSUs 940, which are one example of the first PSUs 240. In this configuration, the PSUs 940 and power distribution boards 610 are provided adjacent to one another along one side of the system board 950, with the boards 610 connected to the system board 950 in a daisy-chain fashion. That is, first power distribution board 610-1 is connected to second power distribution board 610-2 via bus bars 620-1 and 620-2, and second power distribution board 610-2 is connected in turn to VDD socket 951 and GND socket 952 of system board 950 vis bus bars 620-3 and 620-4. (The bus bars 620 are connected to power-pin sockets 613-616, as described above in relation to FIG. 2, but the power-pin sockets 613-616 are not labeled in FIG. 9 to avoid obscuring other aspects).

In this system 901, the PSUs 940 are a first type of PSU having a first type of edge connector which is connectable to the first edge-connector socket 611. For example, the first type of PSU 940 may have a 73.5 mm PSU edge connector. Thus, the power distribution boards 610 are oriented with their socket 611 adjacent the PSUs 940, as the socket 611 is configured to receive the first type of edge connectors.

Although not illustrated in FIG. 9 to avoid obscuring other details, the side-band connectors 617 of the boards 610 may also be connected to the side-band connectors 953 of the system board 950 via cables. For example, side-band connectors 617 of the board 610-1 may be connected by a first cable to side-band connectors 617 of board 610-2, which are in turn connected by a second cable to side-band connector 953 of system board 950.

Figure 10:
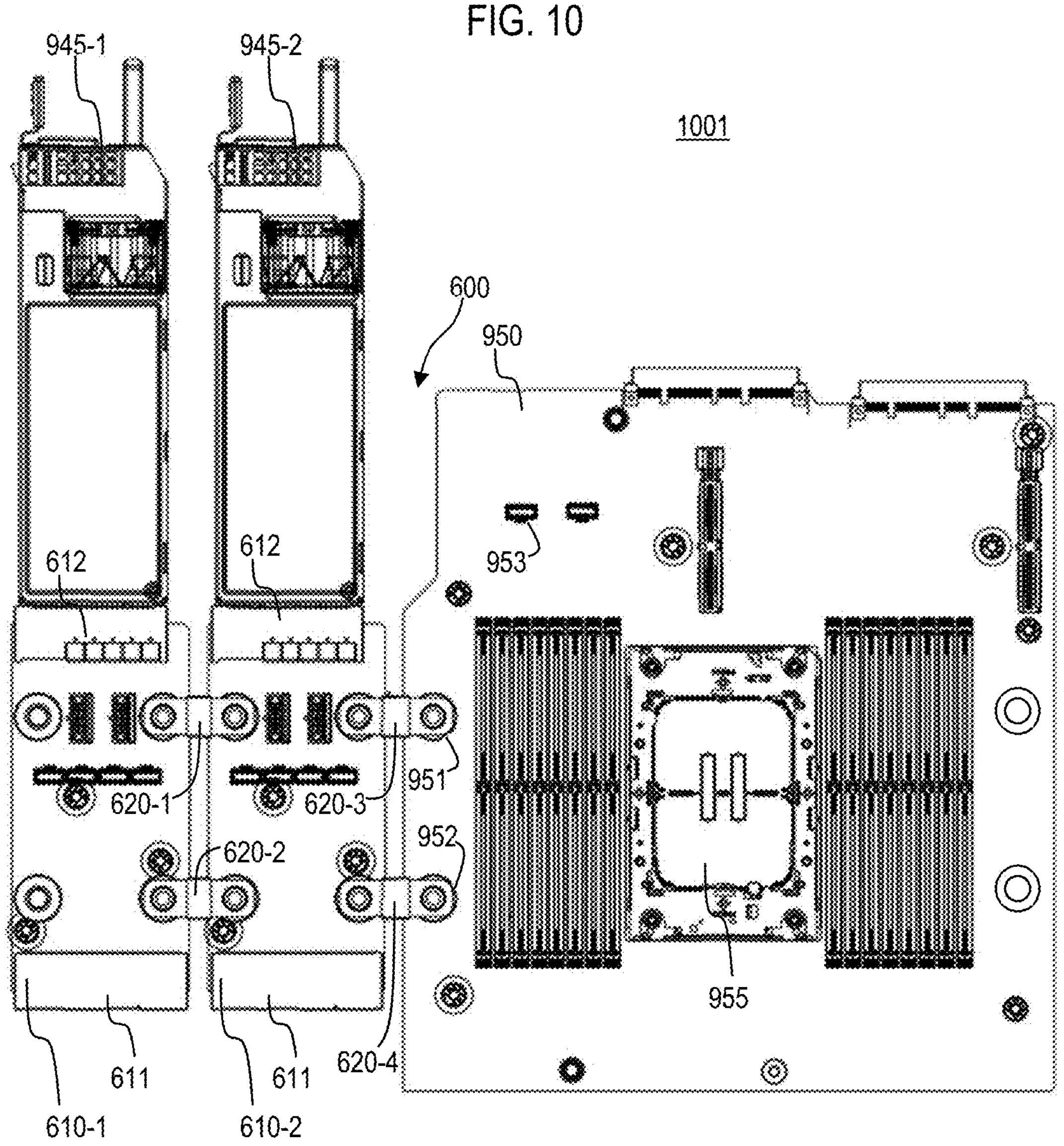
FIG. 10 is a top view of another example information processing system comprising the power distribution system of FIG. 6 in a second configuration.

FIG. 10 illustrates a system 1001 with the modular power distribution subsystem 600 in a second configuration. The second configuration illustrated in FIG. 10 corresponds to one implementation example of the second configuration described above in relation to FIG. 3. In this example, the system 1001 comprises the same system board 950 as in FIG. 9, but has a second type of PSUs 945, which are one example of the PSUs 245. For example, the second type of PSU 945 may have a 60.0 mm PSU edge connector.

In this second configuration, the PSUs 945 and power distribution boards 610 are provided adjacent one another along one side of the system board 950, with the boards 610 connected to the system board 950 in a daisy-chain fashion, similar to the first configuration. However, unlike the first configuration, in the second configuration the boards 610-1 and 610-2 have been reoriented with their second edge-connector sockets 612 facing the PSUs 945.

Figure 11:
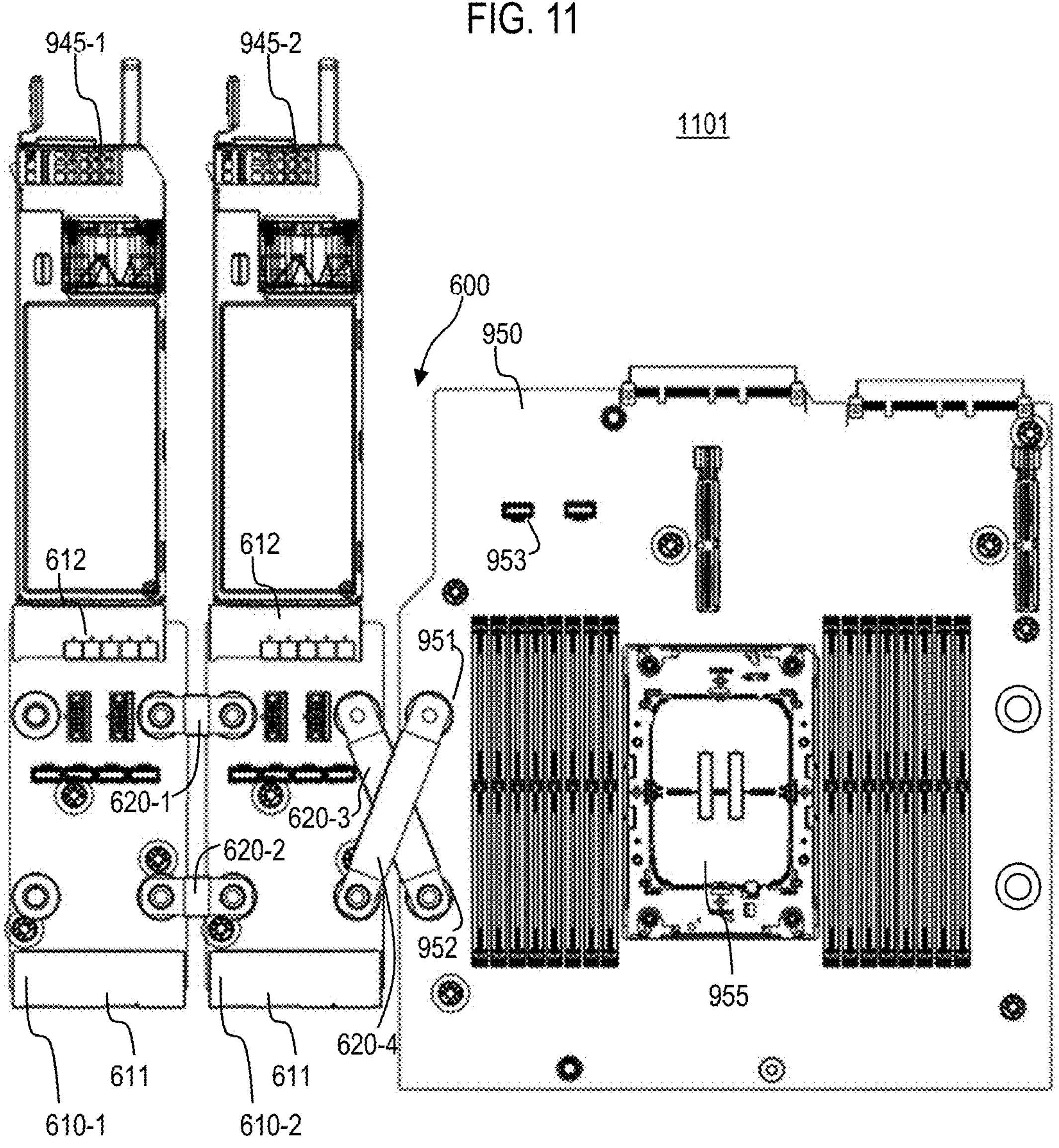
FIG. 11 is a top view of another information processing system comprising the power distribution system of FIG. 6 in a variation of the second configuration.

FIG. 11 illustrates a system 1101 with the modular power distribution subsystem 600 in a variation of the second configuration. The system 1101 is similar to the system 1001 except that the power pins sockets of the boards 610 are connected to different sockets on the system board 950. In particular, in FIG. 11, bus bars 620-3 and 620-4 are arranged in a crossed fashion. (Note that insulators, not labeled, may be arranged on or around the bus bars 620 to avoid unintended electrical connections therebetween). More specifically, instead of bus bar 620-3 connecting third socket 615 of board 610-2 to the VDD socket 951 of system board 950, in system 1101 the bus bar 620-3 connects the third socket 615 of the board 610-2 to the GND socket 952. Similarly, instead of bus bar 620-4 connecting fourth socket 616 of board 610-2 to the GND socket 952, in system 1101 the bus bar 620-4 connects the fourth socket 616 of the board 610-2 to the VDD socket 951. This crossed configuration may be used in implementations in which the third socket 615 is connected to the GND contacts of both sockets 611 and 612 and in which the fourth socket 616 is connected to the VDD contacts of both sockets 611 and 612. In contrast, the configuration illustrated in FIG. 10 may be used in implementations in which the third socket 615 is connected to the VDD contacts of socket 612 and in which the fourth socket 616 is connected to the GND contacts of sockets 612.

Figure 12:
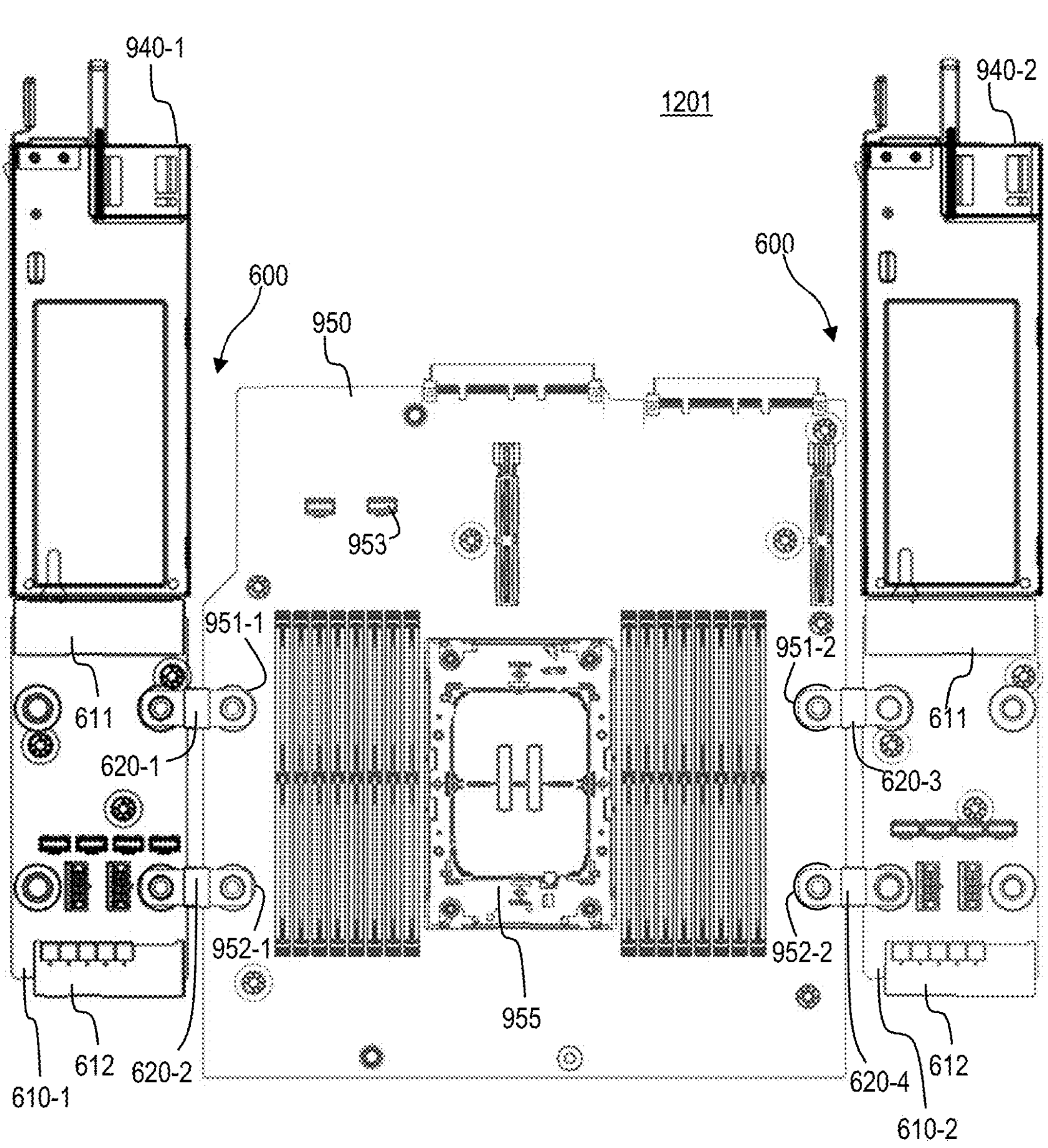
FIG. 12 is a top view of another example information processing system comprising the power distribution system of FIG. 6 in a third configuration.

FIG. 12 illustrates a system 1201 with the modular power distribution subsystem 600 in a third configuration. The third configuration illustrated in FIG. 12 corresponds to one implementation example of the third configuration described above in relation to FIG. 4. In this example, the system 1201 comprises the same system board 950 as in FIG. 9, but the PSUs 940 and power distribution boards 610 are provided on opposite sides of the system board 950, rather than on the same side. That is, first board 610-1 is provided on a left side of the system board 950 and is connected to first VDD socket 951-1 and first GND socket 952-1, while second board 610-2 is provided on a right side of the system board 950 and is connected to second VDD socket 951-2 and second GND socket 952-2. (Second VDD socket 951-2 and second GND socket 952-2 are not labeled in FIGS. 9-11, but in some implementations the system board 950 in systems 901, 1001, and/or 1101, may also comprise second VDD socket 951-2 and second GND socket 952-2).

Figure 13:
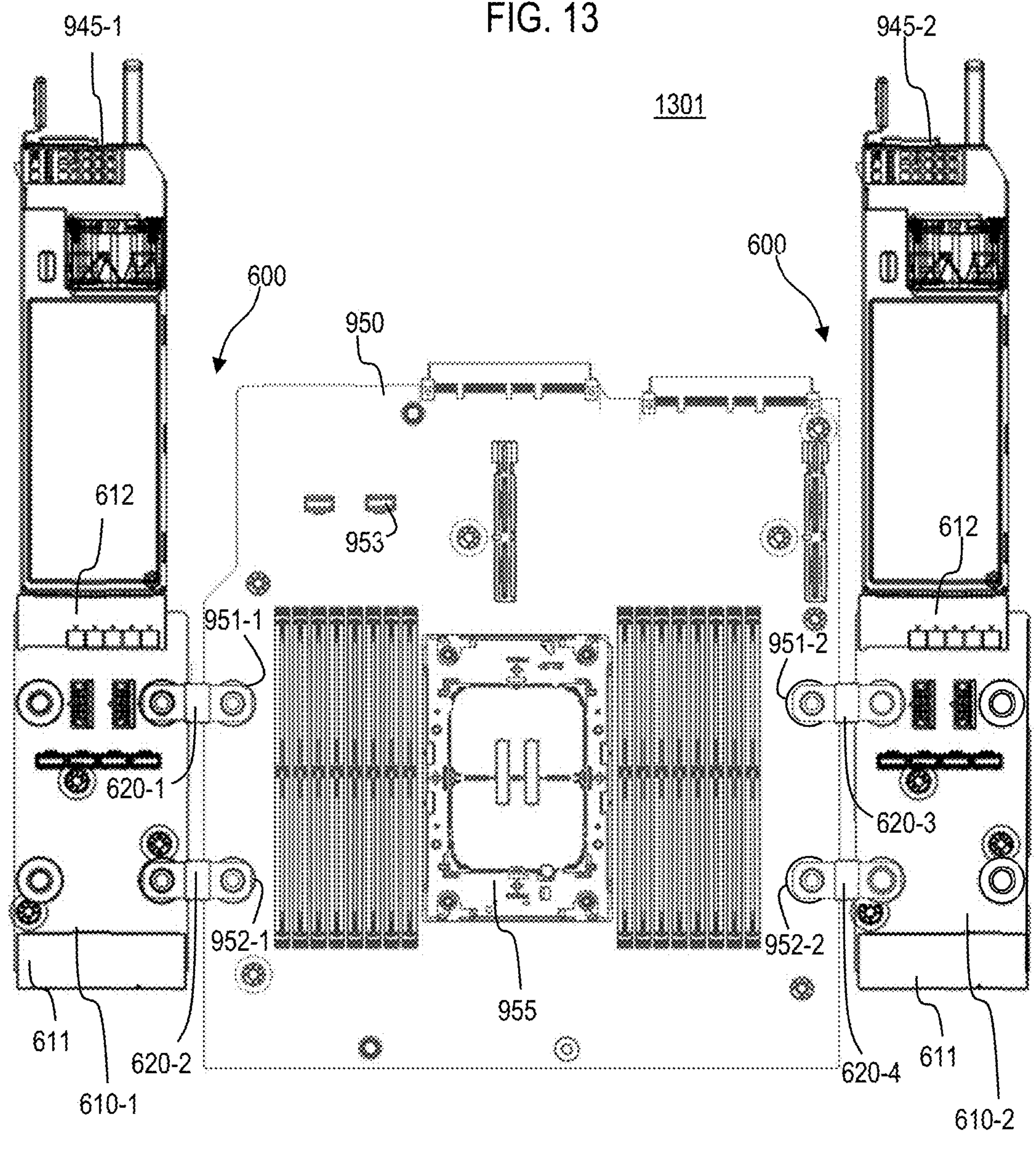
FIG. 13 is a top view of another example information processing system comprising the power distribution system of FIG. 6 in a fourth configuration.

FIG. 13 illustrates a system 1301 with the modular power distribution subsystem 600 in a fourth configuration. The fourth configuration illustrated in FIG. 13 corresponds to one implementation example of the fourth configuration described above in relation to FIG. 5. This example is similar to that of the system 1201, except that the second type of PSU 945 is used and therefore the boards 610-1 and 610-2 are reoriented with their second edge-connector sockets 612 facing the PSUs.

Figure 14:
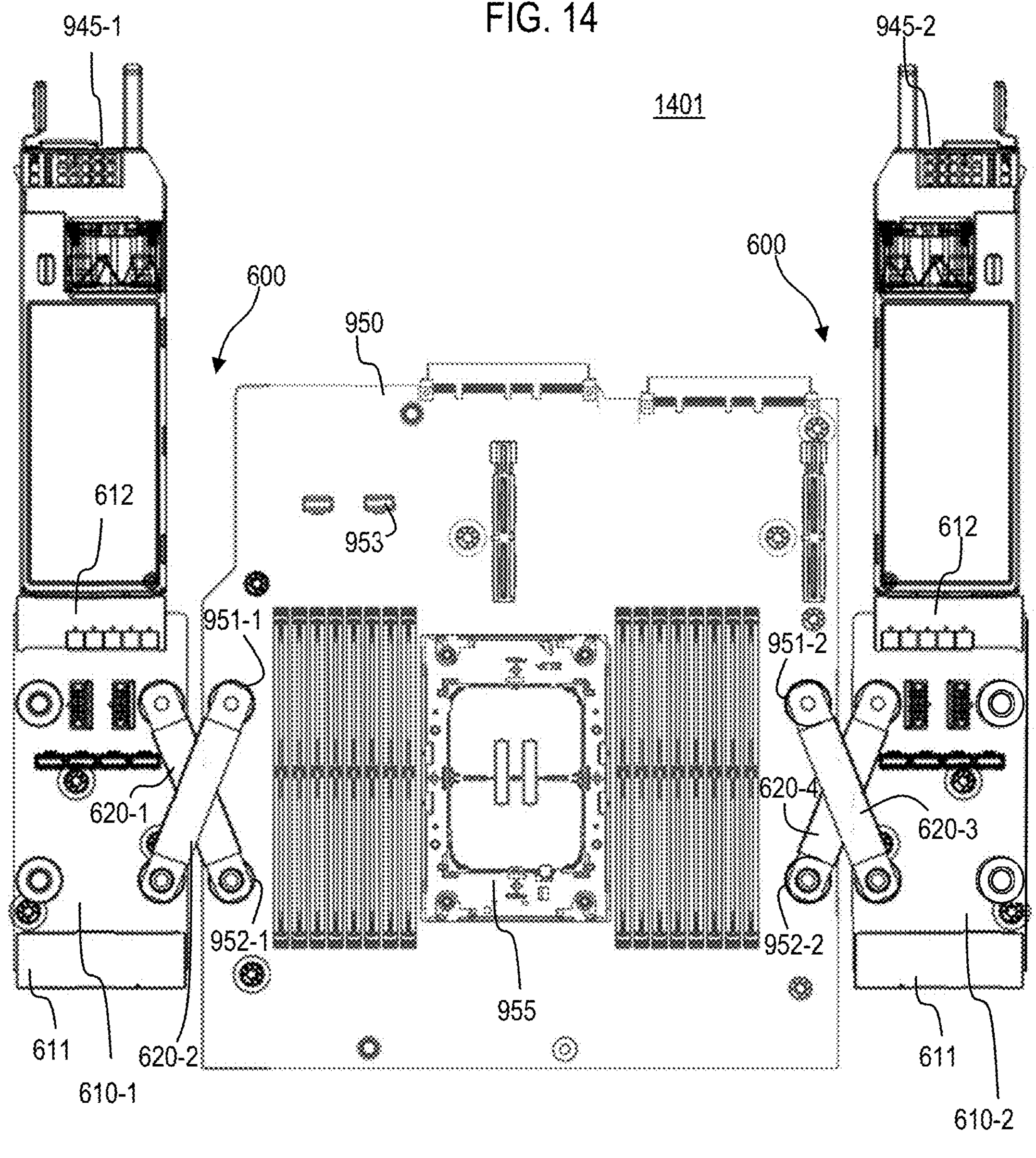
FIG. 14 is a top view of another example information processing system comprising the power distribution system of FIG. 6 in a variation of the fourth configuration.

FIG. 14 illustrates a system 1401 with the modular power distribution subsystem 600 in a variation of the fourth configuration. The system 1401 is similar to the system 1301 except that the power pins sockets of the boards 610 are connected to different sockets on the system board 950. In particular, in FIG. 14, bus bars 620-1 and 620-2 are arranged in a crossed fashion, and bus bars 620-3 and 620-4 are also arranged in a crossed fashion. (Note that insulators, not labeled, may be arranged on or around the bus bars 620 to avoid unintended electrical connections therebetween). More specifically, instead of bus bar 620-1 connecting third socket 615 of board 610-1 to the VDD socket 951-1 of system board 950, in system 1401 the bus bar 620-1 connects the third socket 615 of the board 610-1 to the GND socket 952-1. Similarly, instead of bus bar 620-2 connecting fourth socket 616 of board 610-1 to the GND socket 952-1, in system 1401 the bus bar 620-2 connects the fourth socket 616 of the board 610-2 to the VDD socket 951. Furthermore, instead of bus bar 620-3 connecting second socket 614 of board 610-2 to the VDD socket 951-2 of system board 950, in system 1401 the bus bar 620-3 connects the second socket 614 of the board 610-2 to the GND socket 952-2. Similarly, instead of bus bar 620-4 connecting first socket 613 of board 610-2 to the GND socket 952-2, in system 1401 the bus bar 620-4 connects the first socket 613 of the board 610-2 to the VDD socket 951-2. This crossed configuration may be used in implementations in which the third socket 615 is connected to the GND contacts of both sockets 611 and 612 and in which the fourth socket 616 is connected to the VDD contacts of both sockets 611 and 612. In contrast, the configuration illustrated in FIG. 13 may be used in implementations in which the third socket 615 is connected to the VDD contacts of socket 612 and in which the fourth socket 616 is connected to the GND contacts of sockets 612.

FIGS. 15 and 16 illustrate another example information processing system 1501 comprising the subsystem 601 in a fifth configuration. The fifth configuration is a variation on the first configuration described above in relation to FIG. 2. This example is schematically similar to the example described above in relation to FIG. 9 in that in both of these examples both boards 610 are positioned on the same side of the system board 950 and are connected to the system board 950 in a daisy-chain fashion. However, the example system 1501 differs from the example system 901 in that the boards 610-1 and 620-2 are vertically stacked atop one another, instead of being positioned horizontally adjacent to one another. In other words, the first configuration described above in relation to FIG. 2 may include implementations in which the power distribution boards 110 are horizontally adjacent, such as the implementation of FIG. 9, and implementations in which the power distribution boards 110 are vertically adjacent, such as the implementation of FIGS. 15 and 16.

Specifically, in the example of FIGS. 15-16, the board 620-1 is positioned vertically above the board 620-2. In this example, the columnar bus bars **622*b*-1 and 622*b*-2 may be used to extend vertically between and electrically connect together power-pin sockets of the boards 610-1 and 610-2, while the plate like bus bars 622*a*-3 and 622*a*-4 may be used to extend horizontally between and electrically connect the board 620-2 with the system board 950**.

Although not illustrated, other example systems may include the subsystem 600 in a sixth configuration which is similar to the fifth configuration except that the orientations of the boards 610 are reversed such that the second sockets 612 face the PSUs.

In the description above, various types of electronic circuitry are described. As used herein, "electronic" is intended to be understood broadly to include all types of circuitry utilizing electricity, including digital and analog circuitry, direct current (DC) and alternating current (AC) circuitry, and circuitry for converting electricity into another form of energy and circuitry for using electricity to perform other functions. In other words, as used herein there is no distinction between "electronic" circuitry and "electrical" circuitry.

It is to be understood that both the general description and the detailed description provide examples that are explanatory in nature and are intended to provide an understanding of the present disclosure without limiting the scope of the present disclosure. Various mechanical, compositional, structural, electronic, and operational changes may be made without departing from the scope of this description and the claims. In some instances, well-known circuits, structures, and techniques have not been shown or described in detail in order not to obscure the examples. Like numbers in two or more figures represent the same or similar elements.

In addition, the singular forms "a", "an", and "the" are intended to include the plural forms as well, unless the context indicates otherwise. Moreover, the terms "comprises", "comprising", "includes", and the like specify the presence of stated features, steps, operations, elements, and/or components but do not preclude the presence or addition of one or more other features, steps, operations, elements, components, and/or groups. Components described as connected may be electronically or mechanically directly connected, or they may be indirectly connected via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

And/or: Occasionally the phrase "and/or" is used herein in conjunction with a list of items. This phrase means that any combination of items in the list—from a single item to all of the items and any permutation in between—may be included. Thus, for example, "A, B, and/or C" means "one of {A}, {B}, {C}, {A, B}, {A, C}, {C, B}, and {A, C, B}".

Elements and their associated aspects that are described in detail with reference to one example may, whenever practical, be included in other examples in which they are not specifically shown or described. For example, if an element is described in detail with reference to one example and is not described with reference to a second example, the element may nevertheless be claimed as included in the second example.

Unless otherwise noted herein or implied by the context, when terms of approximation such as "substantially," "approximately," "about," "around," "roughly," and the like, are used, this should be understood as meaning that mathematical exactitude is not required and that instead a range of variation is being referred to that includes but is not strictly limited to the stated value, property, or relationship. In particular, in addition to any ranges explicitly stated herein (if any), the range of variation implied by the usage of such a term of approximation includes at least any inconsequential variations and also those variations that are typical in the relevant art for the type of item in question due to manufacturing or other tolerances. In any case, the range of variation may include at least values that are within +1% of the stated value, property, or relationship unless indicated otherwise.

Further modifications and alternative examples will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various examples shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present teachings and following claims.

It is to be understood that the particular examples set forth herein are non-limiting, and modifications to structure, dimensions, materials, and methodologies may be made without departing from the scope of the present teachings.

Other examples in accordance with the present disclosure will be apparent to those skilled in the art from consideration of the specification and practice of the invention disclosed herein. It is intended that the specification and examples be considered as exemplary only, with the following claims being entitled to their fullest breadth, including equivalents, under the applicable law.

What is claimed is:

1. A modular power distribution subsystem for an information processing device, comprising:

one or more power distribution boards; and a plurality of bus bars, wherein each power distribution board comprises:

a first edge-connector socket configured to receive a first power supply unit (PSU) edge connector;

a second edge-connector socket configured to receive a second PSU edge connector, the second edge-connector socket having a different form factor than the first edge-connector socket; and a plurality of power-pin sockets, each configured to receive a power pin of one of the bus bars, wherein the power distribution boards are connectable, by the bus bars and the power-pin sockets, to a system board of the information processing device in a plurality of different configurations that accommodate a plurality of different types of PSU and/or a plurality of different positional arrangements of PSUs.

2. The modular power distribution subsystem of claim 1, wherein the plurality of different configurations include at least a first configuration and a second configuration;

wherein in a state of the modular power distribution subsystem installed in the information processing device, in the first configuration, the first edge-connector sockets of the power distribution boards are arranged to receive the first PSU edge connectors of first power supply units; and wherein in the second configuration, the second edge-connector sockets of the power distribution boards are arranged to receive the second PSU edge connectors of second power supply units, the second PSU edge connectors being different from the first PSU edge connectors.

3. The modular power distribution subsystem of claim 2, wherein, in the first configuration, each of the power distribution boards is oriented with their respective first edge-connector socket facing in a first direction relative to the system board and their respective second edge-connector socket facing in a second direction relative to the system board, the second direction opposite the first direction; and wherein, in the second configuration, each of the power distribution boards is oriented with their respective second edge-connector socket facing in the first direction and their respective first edge-connector socket facing in the second direction.

4. The modular power distribution subsystem of claim 2, wherein the one or more power distribution boards comprises a plurality of distribution boards; and wherein, in the first configuration and in the second configuration, the power distribution boards are positioned adjacent one another and are connected, by the respective power-pin sockets of the power distribution boards and by the bus bars, to each other and to the system board in a daisy-chain arrangement.

5. The modular power distribution subsystem of claim 4, wherein the plurality of different configurations include:

a first variation of the first configuration in which the power distribution boards are positioned adjacent one another on a first side of the system board;

a second variation of the first configuration in which the power distribution boards are positioned adjacent one another on a second side of the system board, opposite the first side;

a first variation of the second configuration in which the power distribution boards are positioned adjacent one another on the first side of the system board; and a second variation of the second configuration in which the power distribution boards are positioned adjacent one another on the second side of the system board.

6. The modular power distribution subsystem of claim 4, wherein the plurality of different configurations including at least a third configuration in which a first group comprising one or more of the power distribution boards is positioned on a first side of the system board and a second group comprising one or more of the power distribution boards is positioned on a second side of the system board.

7. The modular power distribution subsystem of claim 6, wherein in the third configuration, the first edge-connector sockets of the power distribution boards are arranged to receive first PSU edge connectors of first power supply units; and the plurality of different configurations including at least a fourth configuration in which the first group comprising one or more of the power distribution boards is positioned on the first side of the system board and the second group comprising one or more of the power distribution boards is positioned on the second side of the system board and the second edge-connector sockets of the power distribution boards are arranged to receive second PSU edge connectors of second power supply units.

8. The modular power distribution subsystem of claim 2, wherein the one or more power distribution boards comprises a first power distribution board and a second power distribution board;

wherein, in the first and second configurations, the first and second power distribution boards are positioned adjacent one another on a first side of the system board;

wherein, in the first configuration, a first pair of the power-pin sockets of the second power distribution board are connected to the system board by a first pair of the bus bars, and a first pair of the power-pin sockets of the first power distribution board are connected to a second pair of the power-pin sockets of the second power distribution board by a second pair of the bus bars; and wherein, in the second configuration, the second pair of the power-pin sockets of the second power distribution board are connected to the system board by the first pair of the bus bars, and a second pair of the power-pin sockets of the first power distribution board are connected to the first pair of the power-pin sockets of the second distribution board by the second pair of the bus bars.

9. The modular power distribution subsystem of claim 8, wherein in the first and second configurations the first and second power distribution boards are horizontally adjacent to one another.

10. The modular power distribution subsystem of claim 8, wherein in the first and second configurations the first and second power distribution boards are vertically adjacent to one another.

11. The modular power distribution subsystem of claim 2, wherein the one or more power distribution boards comprises a first power distribution board and a second power distribution board;

wherein the plurality of different configurations include a third configuration in which the first power distribution board is positioned adjacent a first side of the system board and the second power distribution boards is positioned adjacent a second side of the system board, opposite the first side.

12. The modular power distribution subsystem of claim 11, wherein the plurality of configurations include a fourth configuration in which the first power distribution board is positioned adjacent the first side of the system board and the second power distribution board is positioned adjacent the second side of the system board;

wherein, in the third configuration, a first pair of the power-pin sockets of the first power distribution board are connected to the system board by a first pair of the bus bars, a second pair of the power-pin sockets of the second power distribution board are connected to the system board by a second pair of the bus bars, and the first edge-connector sockets of the first and second power distribution boards are arranged to receive the first PSU edge connectors; and wherein, in the fourth configuration, a second pair of the power-pin sockets of the first power distribution board are connected to the system board by the first pair of the bus bars, a first pair of the power-pin sockets of the second power distribution board are connected to the system board by the second pair of the bus bars, and the second edge-connector sockets of the first and second power distribution boards are arranged to receive the second PSU edge connectors.

* * * * *